United States Patent
Chen

(10) Patent No.: US 9,829,688 B2
(45) Date of Patent: Nov. 28, 2017

(54) ZOOM LENS

(71) Applicants: Sintai Optical (Shenzhen) Co., Ltd., Shenzhen, Guandong Province (CN); Asia Optical International Ltd., Taichung (TW)

(72) Inventor: Ming-Chung Chen, Changhua (TW)

(73) Assignees: SINTAI OPTICAL (SHENZHEN) CO., LTD., Taichung (TW); ASIA OPTICAL INTERNATIONAL LTD., Taichung (TW)

(*) Notice: Subject to any disclaimer, the term of this patent is extended or adjusted under 35 U.S.C. 154(b) by 45 days.

(21) Appl. No.: 14/999,377

(22) Filed: May 2, 2016

(65) Prior Publication Data
US 2016/0377847 A1 Dec. 29, 2016

(30) Foreign Application Priority Data
Jun. 26, 2015 (CN) .......................... 2015 1 0367384

(51) Int. Cl.
G02B 15/14 (2006.01)
G02B 9/34 (2006.01)
G02B 15/177 (2006.01)
G02B 13/18 (2006.01)
G02B 13/00 (2006.01)
(Continued)

(52) U.S. Cl.
CPC ......... *G02B 15/177* (2013.01); *G02B 13/009* (2013.01); *G02B 13/18* (2013.01); *G02B 5/005* (2013.01); *G02B 9/34* (2013.01); *G02B 13/002* (2013.01); *G02B 13/0065* (2013.01); *G02B 15/14* (2013.01); *G02B 15/15* (2013.01); *G02B 15/167* (2013.01); *G02B 15/20* (2013.01); *G02B 15/24* (2013.01); *G02B 17/08* (2013.01); *G02B 17/0856* (2013.01); *G02B 19/0028* (2013.01); *G02B 27/0025* (2013.01)

(58) Field of Classification Search
CPC .... G02B 27/0025; G02B 15/20; G02B 13/18; G02B 9/34; G02B 15/177; G02B 13/009; G02B 15/14; G02B 5/005; G02B 13/0065; G02B 15/15; G02B 15/167; G02B 15/24; G02B 17/08; G02B 19/0028; G02B 13/002; G02B 17/0856
USPC ....... 359/683, 684, 686, 715, 726, 733, 740, 359/753, 781, 783
See application file for complete search history.

(56) References Cited

U.S. PATENT DOCUMENTS 7,872,807 B2 * 1/2011 Mihara ................ G02B 15/173 359/683
7,990,623 B2 * 8/2011 Hatakeyama ........ G02B 15/173 359/557

(Continued)

*Primary Examiner* — Evelyn A Lester
(74) *Attorney, Agent, or Firm* — McClure, Qualey & Rodack, LLP

(57) ABSTRACT

A zoom lens has a four-group zoom configuration, in order from the object side to the image side, consisting of negative, positive, positive, and positive refractive power. The zoom lens carries out zooming from the wide-angle end to the telephoto end mainly by changing the distance between the third lens group and the fourth lens group. Also, the distance between the second lens group and the third lens group may be decreased in the zooming. Focusing is carried out mainly by moving the second lens group along the optical axis. Such a zoom lens is thin and small in size, and has a great imaging performance.

20 Claims, 30 Drawing Sheets

(51) Int. Cl.
      *G02B 27/00*       (2006.01)
      *G02B 15/24*       (2006.01)
      *G02B 15/20*       (2006.01)
      *G02B 15/15*       (2006.01)
      *G02B 5/00*        (2006.01)
      *G02B 15/167*      (2006.01)
      *G02B 17/08*       (2006.01)
      *G02B 19/00*       (2006.01)

(56) References Cited

U.S. PATENT DOCUMENTS

| | | | | |
|---|---|---|---|---|
| 8,699,145 B2* | 4/2014 | Kubota | ............... | G02B 15/173 |
| | | | | 359/686 |
| 9,500,841 B2* | 11/2016 | Ichikawa | ............. | G02B 15/177 |
| 2003/0206352 A1* | 11/2003 | Mihara | ............... | G02B 15/177 |
| | | | | 359/684 |
| 2009/0097130 A1* | 4/2009 | Mihara | ................. | G02B 13/04 |
| | | | | 359/680 |

* cited by examiner

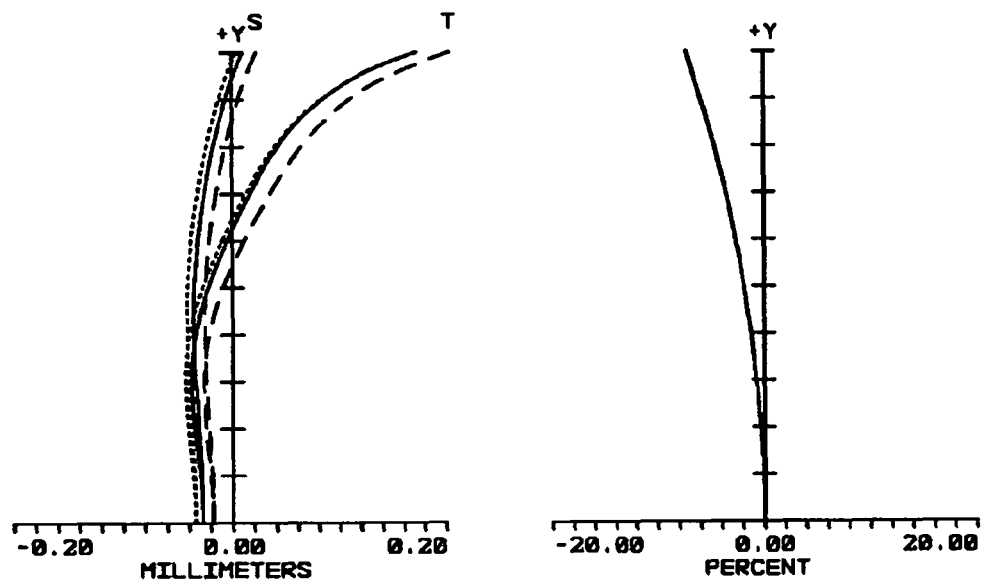
FIG. 11C
FIG. 11D
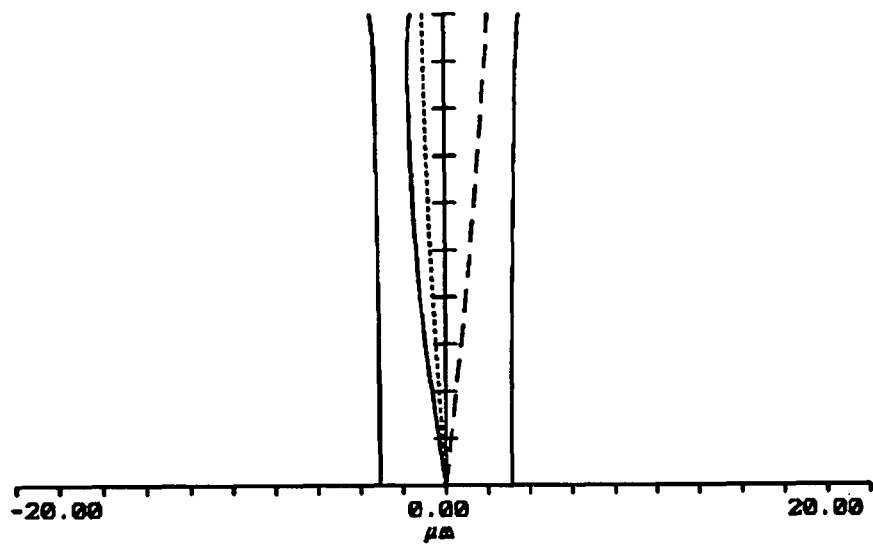
FIG. 11E

ZOOM LENS

TECHNICAL FIELD OF THE INVENTION

The present invention relates to a zoom lens, and more particularly, to a zoom lens applicable to a digital or non-digital image pickup device and having advantages of high-resolution optical performance, and thin and small in size.

BACKGROUND OF THE INVENTION

As with a rapid development of photography technology, the demand on thin, small, and light electronic products (e.g., digital cameras, digital camcorders, smart phones, and tablets) equipped with an image pickup device is higher and higher.

Collapsible zoom lens is a stretchable lens, which can be outstretched beyond the body of a camera, and the lens barrier is stretchable in zooming. In use, the lens groups of this type of lens have to be frequently stretched and need to be stretched out from the body. Therefore, the lens may malfunction due to collisions easily occurred. Also, in this type of lens, the distance is much longer in zooming, and thus the lens cannot satisfy the demand on thinness.

Optical zooming and focusing for an inner zoom lens or a periscope lens are accomplished inside the body. The lens does not need to be stretched out from the body. Therefore, the image pickup device can be small in size, the volume is reduced, and the demand on thin, small, and light products can be met. Also, the lens is protected without damage since the lens does not have to be stretched out from the body. In addition, the length of the lens barrier of the inner zoom lens is fixed, and thus the lens is sealed better than the collapsible zoom lens.

The present invention devotes to develop a thinner lens product and meanwhile satisfy the requirement of excellent imaging performance under the optical structure of an inner zoom lens.

SUMMARY OF THE INVENTION

An objective of the present invention is to provide a zoom lens with a four-group zoom configuration consisting of negative, positive, positive, and positive refractive power, capable of satisfying a high-resolution optical performance and carrying out a thin and small zoom lens.

To achieve above objective, the present invention provides a zoom lens comprising, in order from an object side to an image side along an optical axis: a first lens group having negative refractive power, the first lens group having a reflection member for changing the direction of light; a second lens group having positive refractive power; a third lens group having positive refractive power, the third lens group having a first lens on the most object side, the first lens having a convex surface facing the image side; and a fourth lens group having positive refractive power; wherein in zooming from a wide-angle end to a telephoto end, the first lens group is stationary, and the ratio of the variable distance between the first lens group and the second lens group at the wide-angle end to the variable distance between the first lens group and the second lens group at a medium-angle end is disproportional to the ratio of the variable distance between the first lens group and the second lens group at the medium-angle end to the variable distance between the first lens group and the second lens group at the telephoto end; in zooming from the wide-angle end to the telephoto end, the variable distance between the second lens group and the third lens group is decreased; and focusing is carried out by moving the second lens group along the optical axis.

Another aspect of the present invention provides a zoom lens comprising, in order from an object side to an image side along an optical axis: a first lens group having negative refractive power; a second lens group having positive refractive power; a third lens group having positive refractive power; and a fourth lens group having positive refractive power; wherein the first lens group is stationary and the third lens group and the fourth lens group move in zooming; focusing is carried out by moving the second lens group; and the ratio of the focal length of the third lens group to that of the second lens group satisfies the following condition: $0.3 \leq f3/f2 \leq 1$, where $f3$ is the focal length of the third lens group and $f2$ is the focal length of the second lens group.

Still another aspect of the present invention provides a zoom lens comprising, in order from an object side to an image side along an optical axis: a first lens group having negative refractive power, the first lens group having a reflection member for changing the direction of light; a second lens group having positive refractive power; a third lens group having positive refractive power, the third lens group having a first lens on the most object side, the first lens having a convex surface facing the image side; and a fourth lens group having positive refractive power; wherein in zooming from a wide-angle end to a telephoto end, the first lens group is stationary and the third lens group and the fourth lens group move in zooming, and the ratio of the variable distance between the first lens group and the second lens group at the wide-angle end to the variable distance between the first lens group and the second lens group at a medium-angle end is disproportional to the ratio of the variable distance between the first lens group and the second lens group at the medium-angle end to the variable distance between the first lens group and the second lens group at the telephoto end; in zooming from the wide-angle end to the telephoto end, the variable distance between the second lens group and the third lens group is decreased; and focusing is carried out by moving the second lens group along the optical axis; and wherein the ratio of the focal length of the third lens group to that of the second lens group satisfies the following condition: $0.3 \leq f3/f2 \leq 1$, where $f3$ is the focal length of the third lens group and $f2$ is the focal length of the second lens group.

In the optical arrangements of the present invention, the zoom lens adopts a four-group zoom configuration consisting of negative, positive, positive, and positive refractive power. In zooming under the inner zooming framework, the first lens group is stationary, and the second lens group, the third lens group, and the fourth lens group move along the optical axis. In zooming from the wide-angle end to the telephoto end, the distance between the third lens group and the fourth lens group is changed, the ratio of the variable distance between the first lens group and the second lens group at the wide-angle end to the variable distance between the first lens group and the second lens group at the medium-angle end is disproportional to the ratio of the variable distance between the first lens group and the second lens group at the medium-angle end to the variable distance between the first lens group and the second lens group at the telephoto end, and the distance between the second lens group and the third lens group may be decreased. Focusing is carried out mainly by moving the second lens group along the optical axis. The inner zoom lens of the present invention satisfies a high-resolution optical performance and such a zoom lens is thin and small in size.

BRIEF DESCRIPTION OF THE DRAWINGS

FIGS. 11A to 11E are diagrams showing the optical performance including spherical aberration, comatic aberration, field curvature, distortion, and lateral color of the zoom lens of the second embodiment of the present invention at the medium-angle end.

DETAILED DESCRIPTION OF THE INVENTION

To make the above-mentioned and other objectives, features, and effects of the present invention more easily understood, the present invention is described in further detail below with reference to the embodiments in accompanying with the appending drawings.

Figure 1:
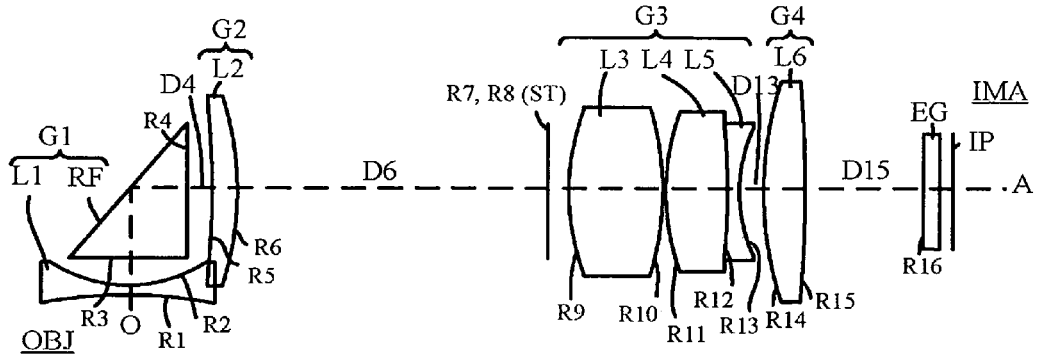
FIG. 1 is a schematic diagram showing an optical arrangement of a zoom lens at a wide-angle end in accordance with a first embodiment of the present invention.
Figure 2:
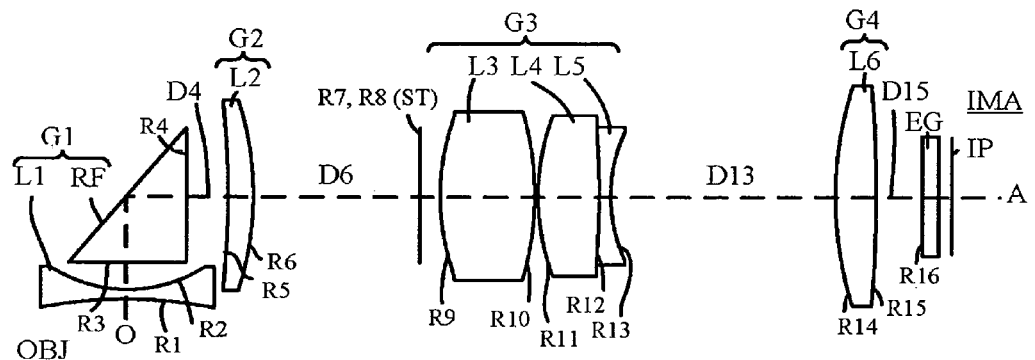
FIG. 2 is a schematic diagram showing an optical arrangement of the zoom lens at a medium-angle end in accordance with the first embodiment of the present invention.
Figure 3:
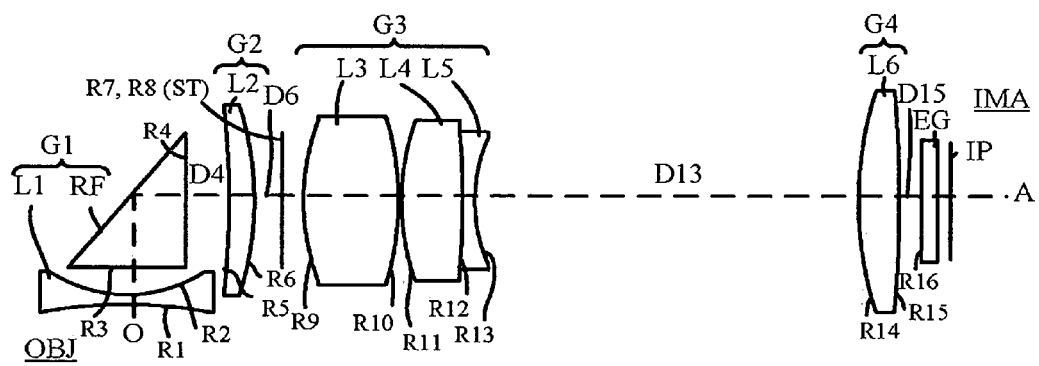
FIG. 3 is a schematic diagram showing an optical arrangement of the zoom lens at a telephoto end in accordance with the first embodiment of the present invention.
Figure 4A:
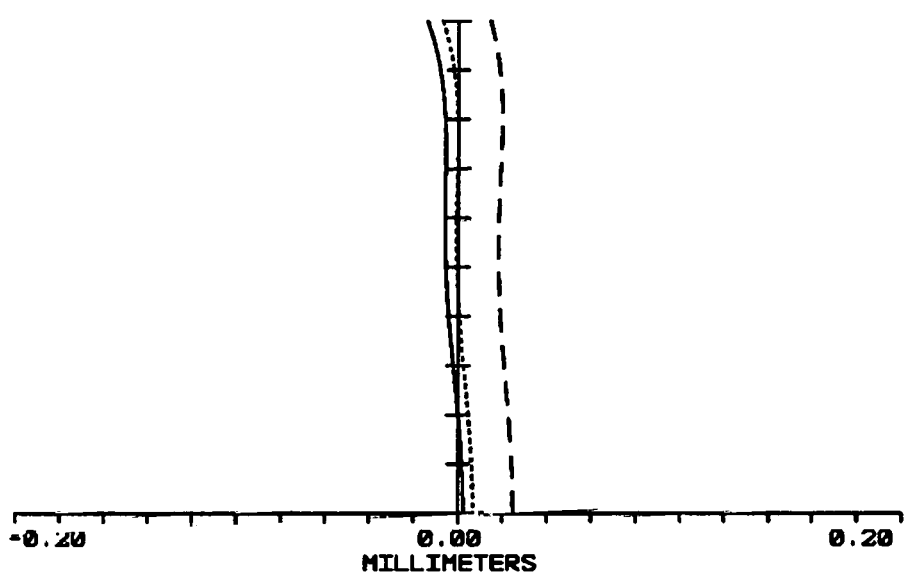
FIGS. 4A to 4E are diagrams showing the optical performance including spherical aberration, comatic aberration, field curvature, distortion, and lateral color of the zoom lens of the first embodiment of the present invention at the wide-angle end.
Figure 4B:
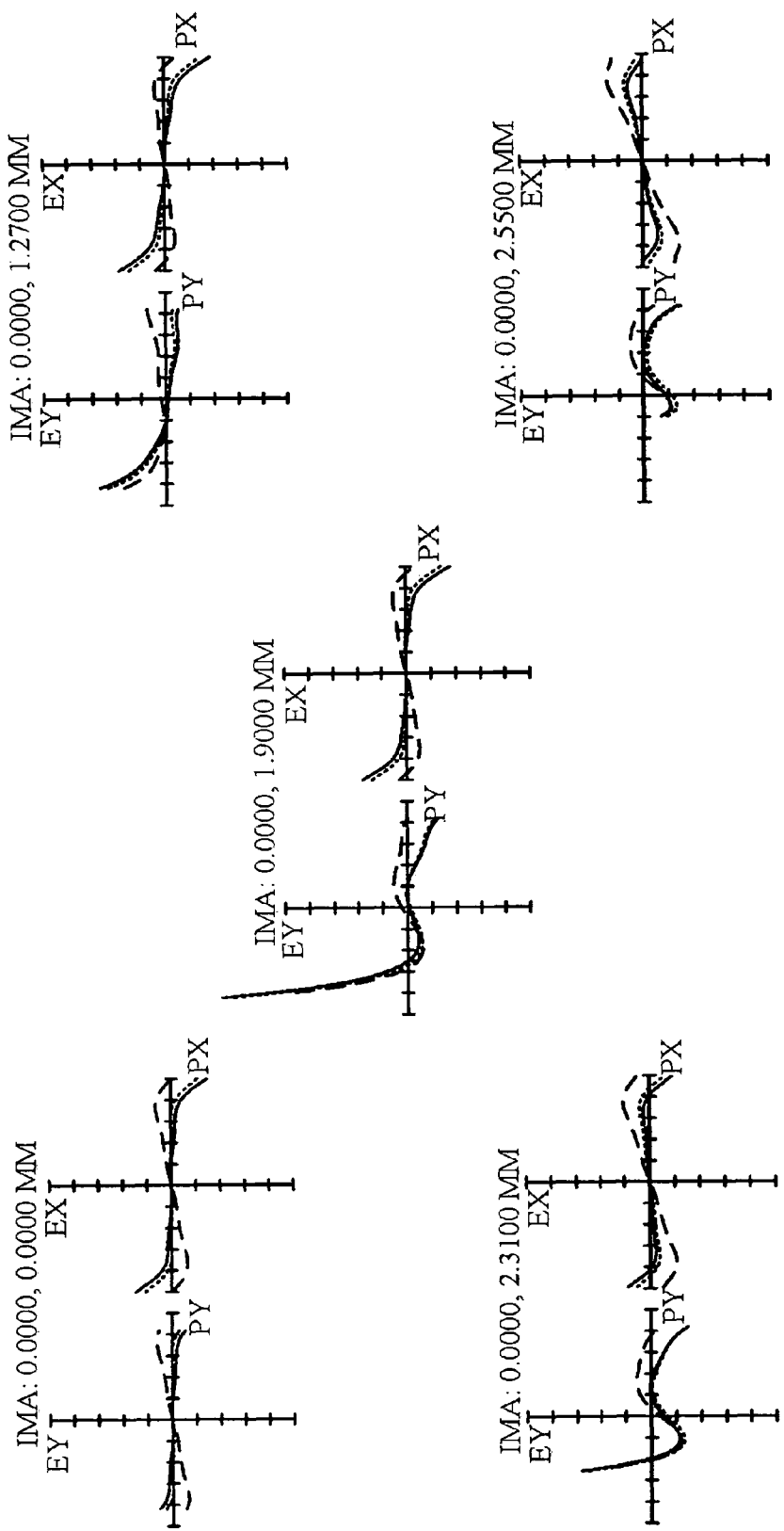
Figure 4C:
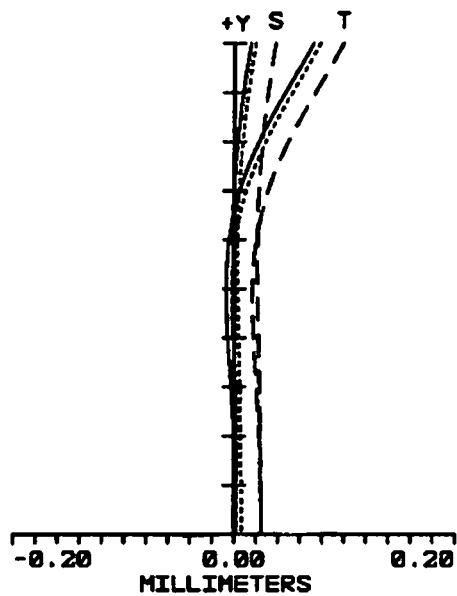
Figure 4D:
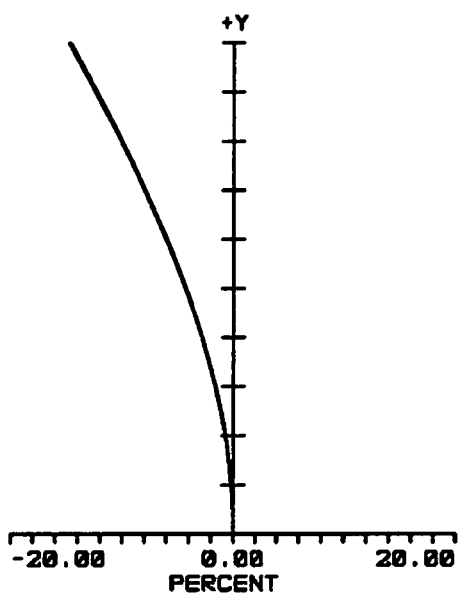
Figure 4E:
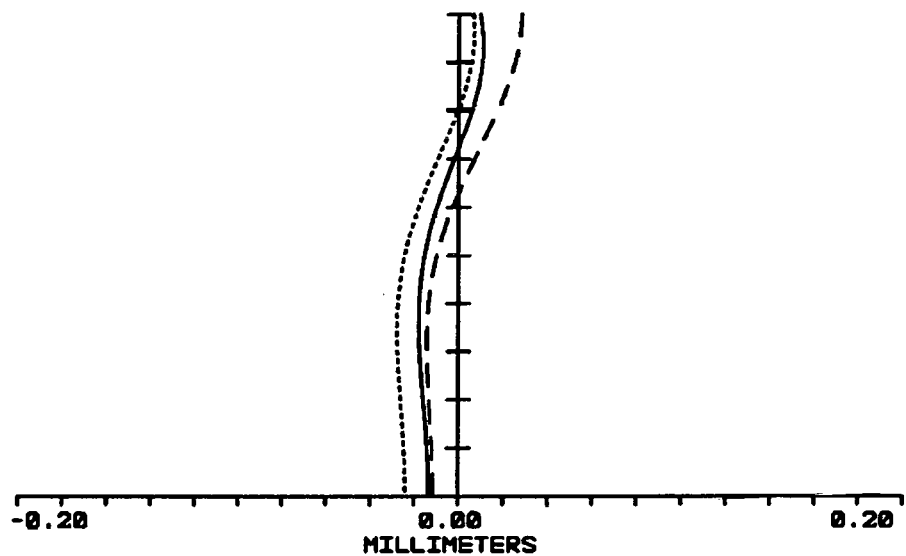
Figure 5A:
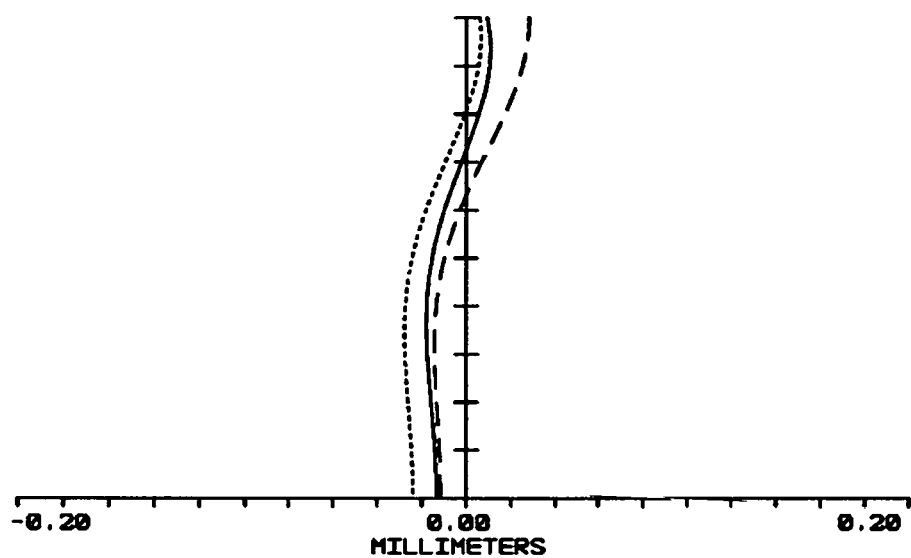
FIGS. 5A to 5E are diagrams showing the optical performance including spherical aberration, comatic aberration, field curvature, distortion, and lateral color of the zoom lens of the first embodiment of the present invention at the medium-angle end.
Figure 5B:
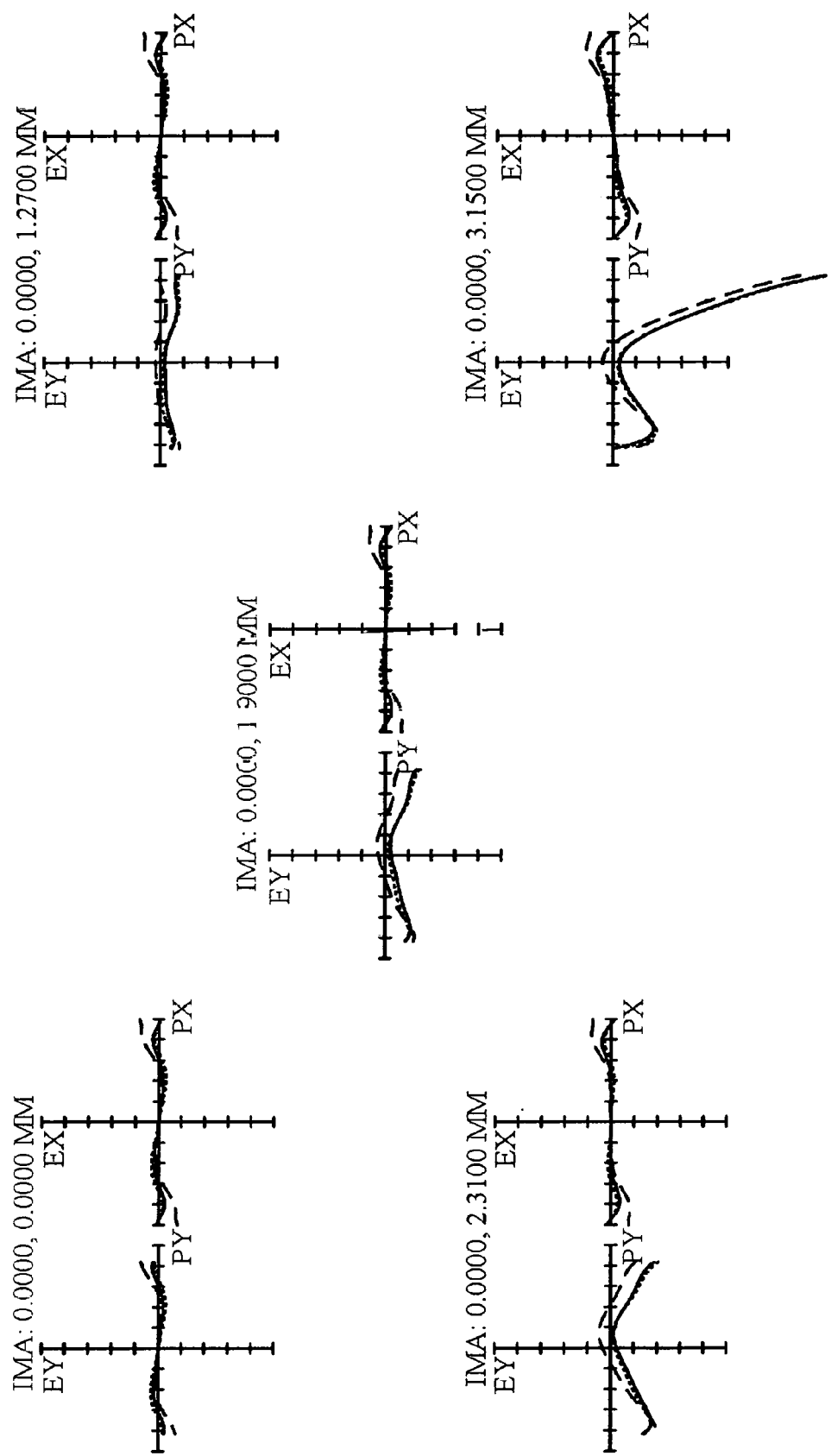
Figure 5C:
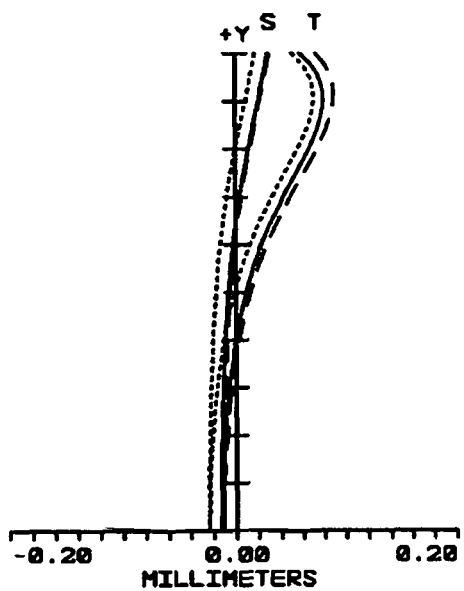
Figure 5D:
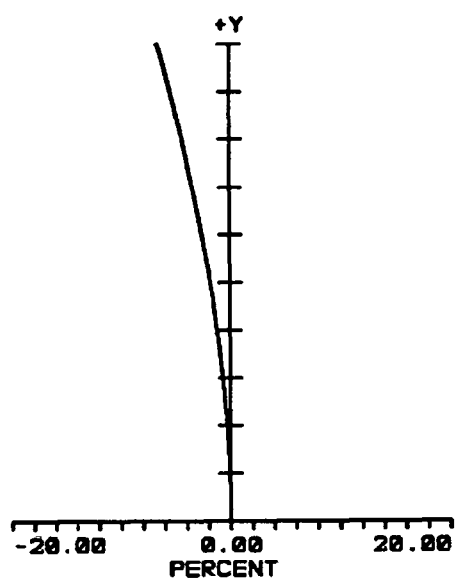
Figure 5E:
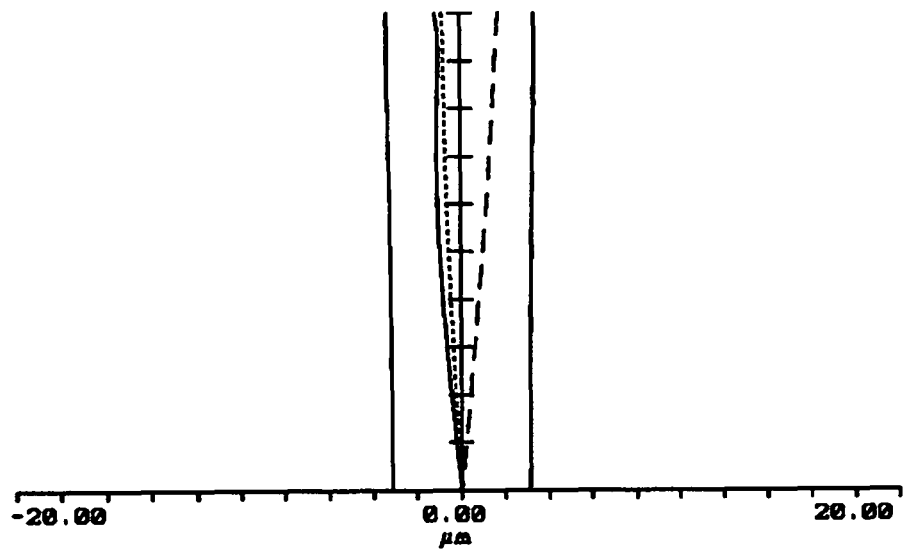
Figure 6A:
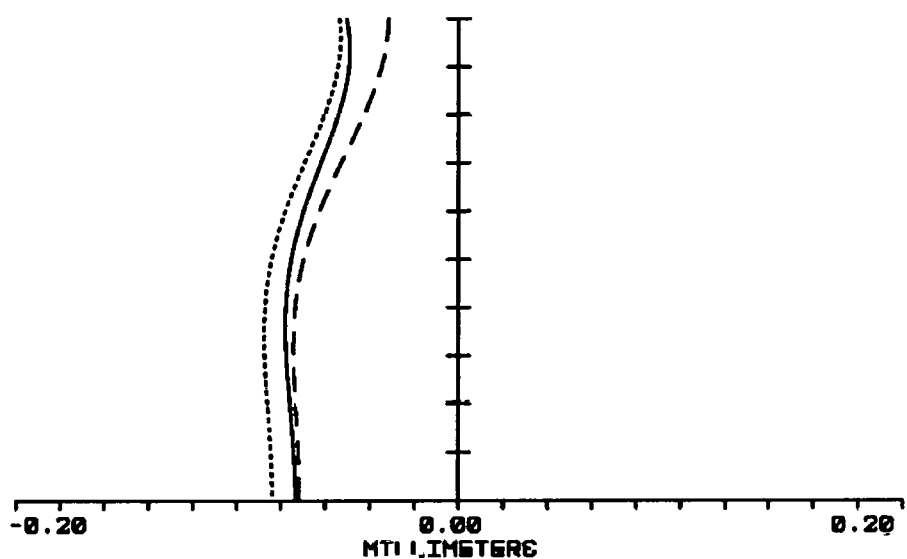
FIGS. 6A to 6E are diagrams showing the optical performance including spherical aberration, comatic aberration, field curvature, distortion, and lateral color of the zoom lens of the first embodiment of the present invention at the telephoto end.
Figure 6B:
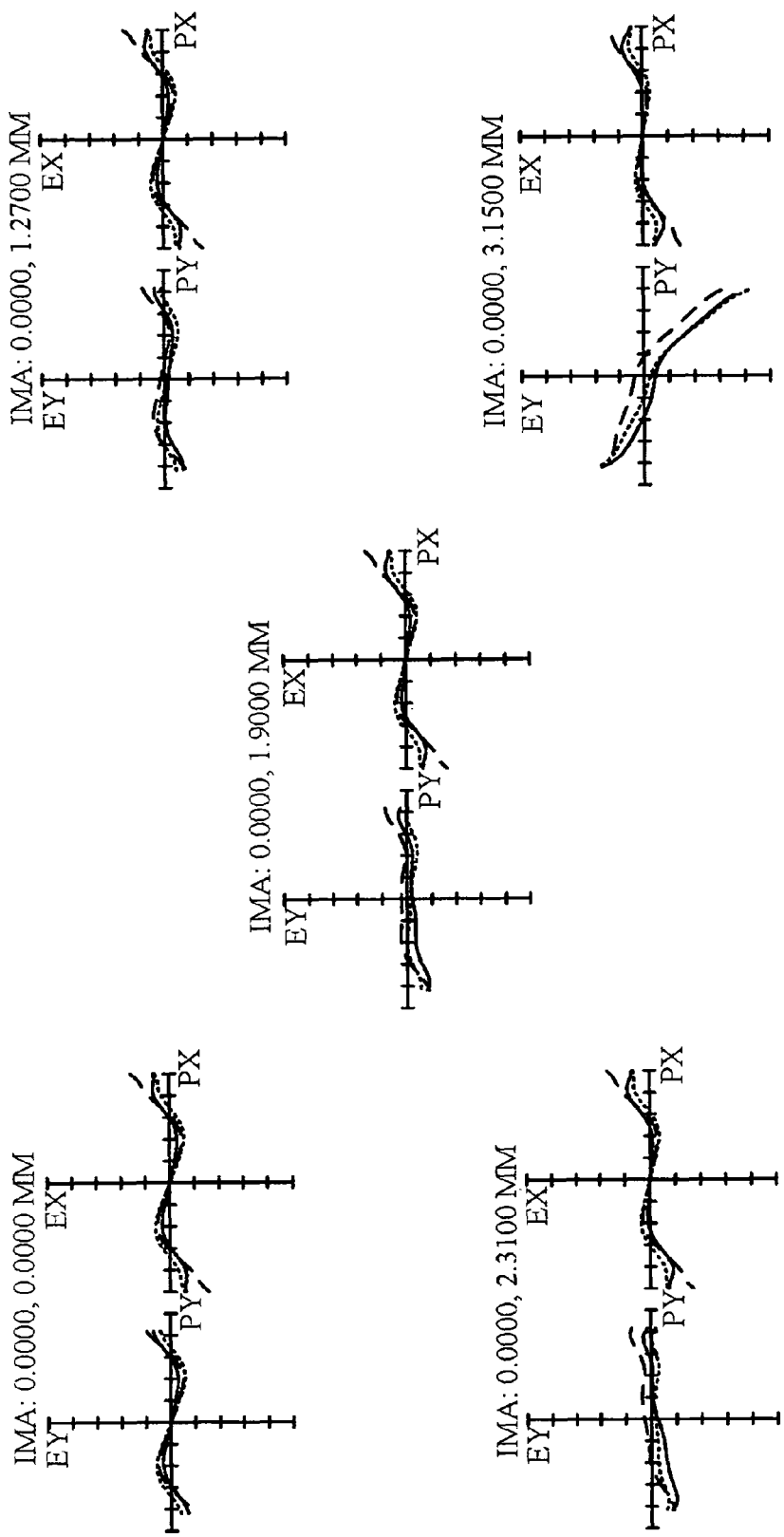
Figure 6C:
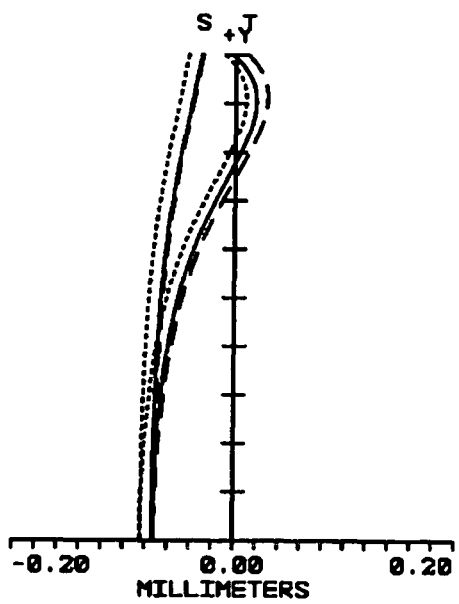
Figure 6D:
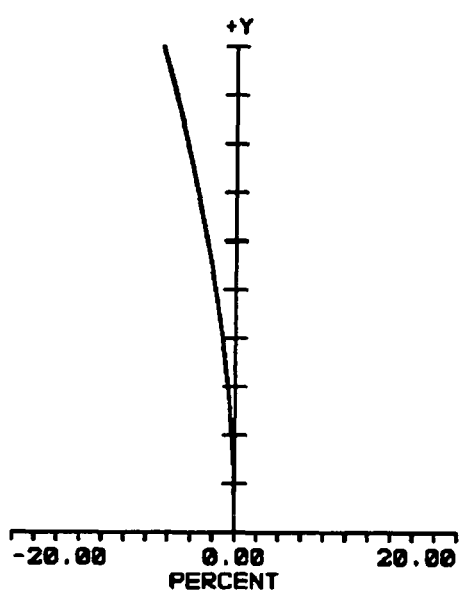
Figure 6E:
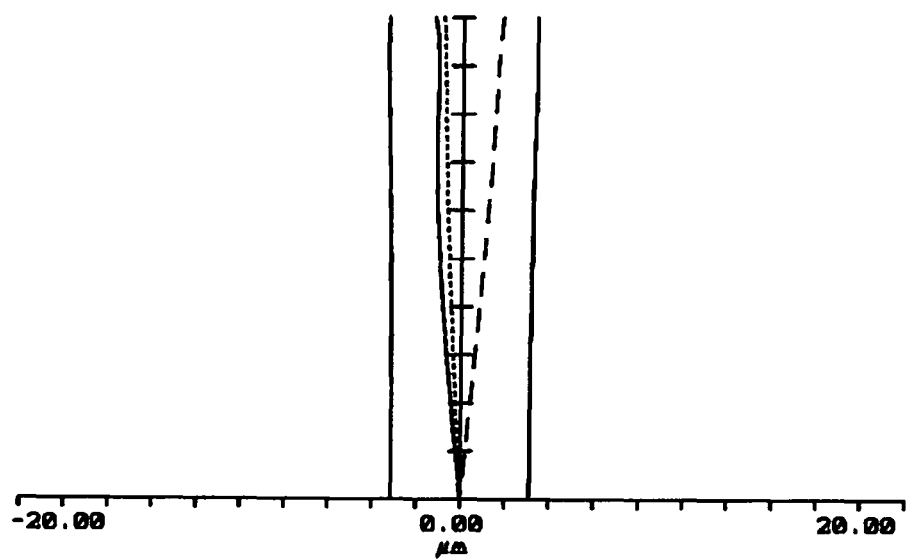
Figure 7:
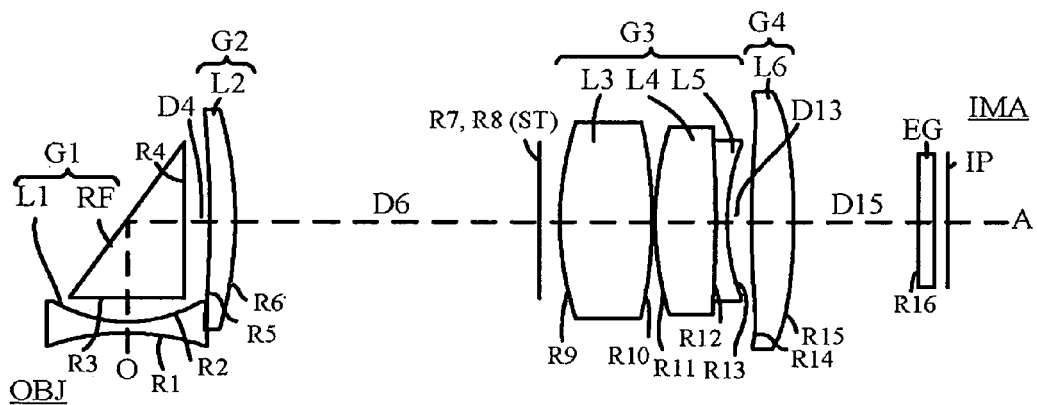
FIG. 7 is a schematic diagram showing an optical arrangement of a zoom lens at the wide-angle end in accordance with a second embodiment of the present invention.
Figure 8:
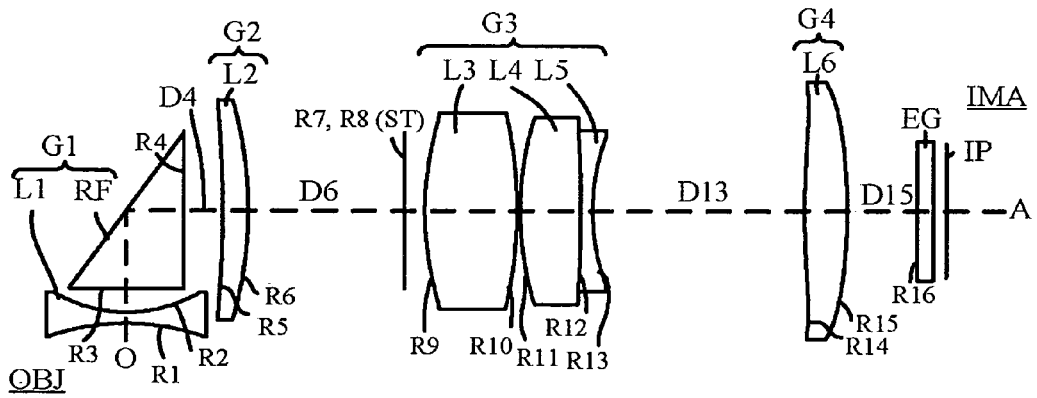
FIG. 8 is a schematic diagram showing an optical arrangement of the zoom lens at the medium-angle end in accordance with the second embodiment of the present invention.
Figure 9:
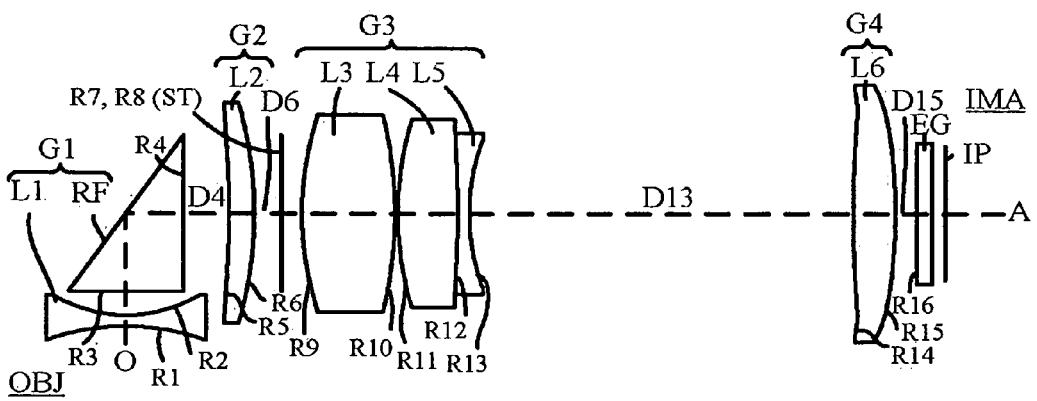
FIG. 9 is a schematic diagram showing an optical arrangement of the zoom lens at the telephoto end in accordance with the second embodiment of the present invention.
Figure 10A:
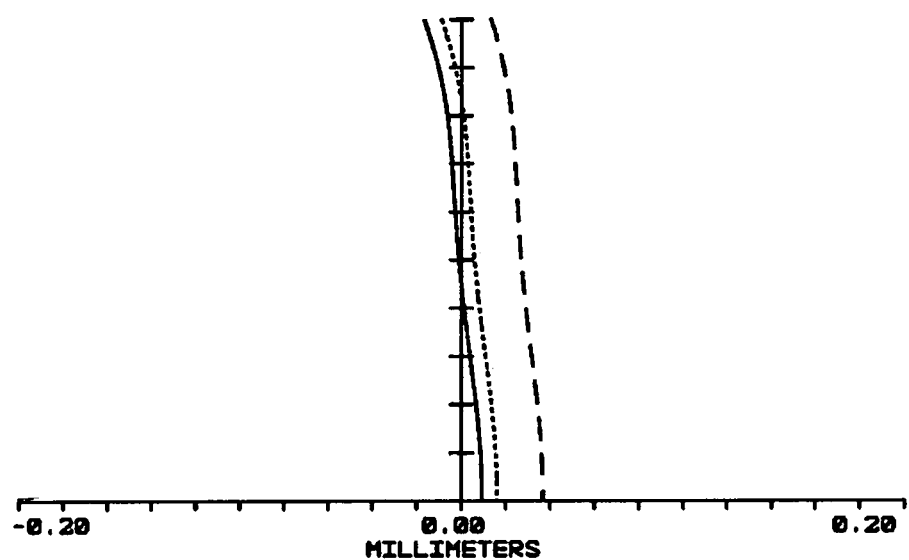
FIGS. 10A to 10E are diagrams showing the optical performance including spherical aberration, comatic aberration, field curvature, distortion, and lateral color of the zoom lens of the second embodiment of the present invention at the wide-angle end.
Figure 10B:
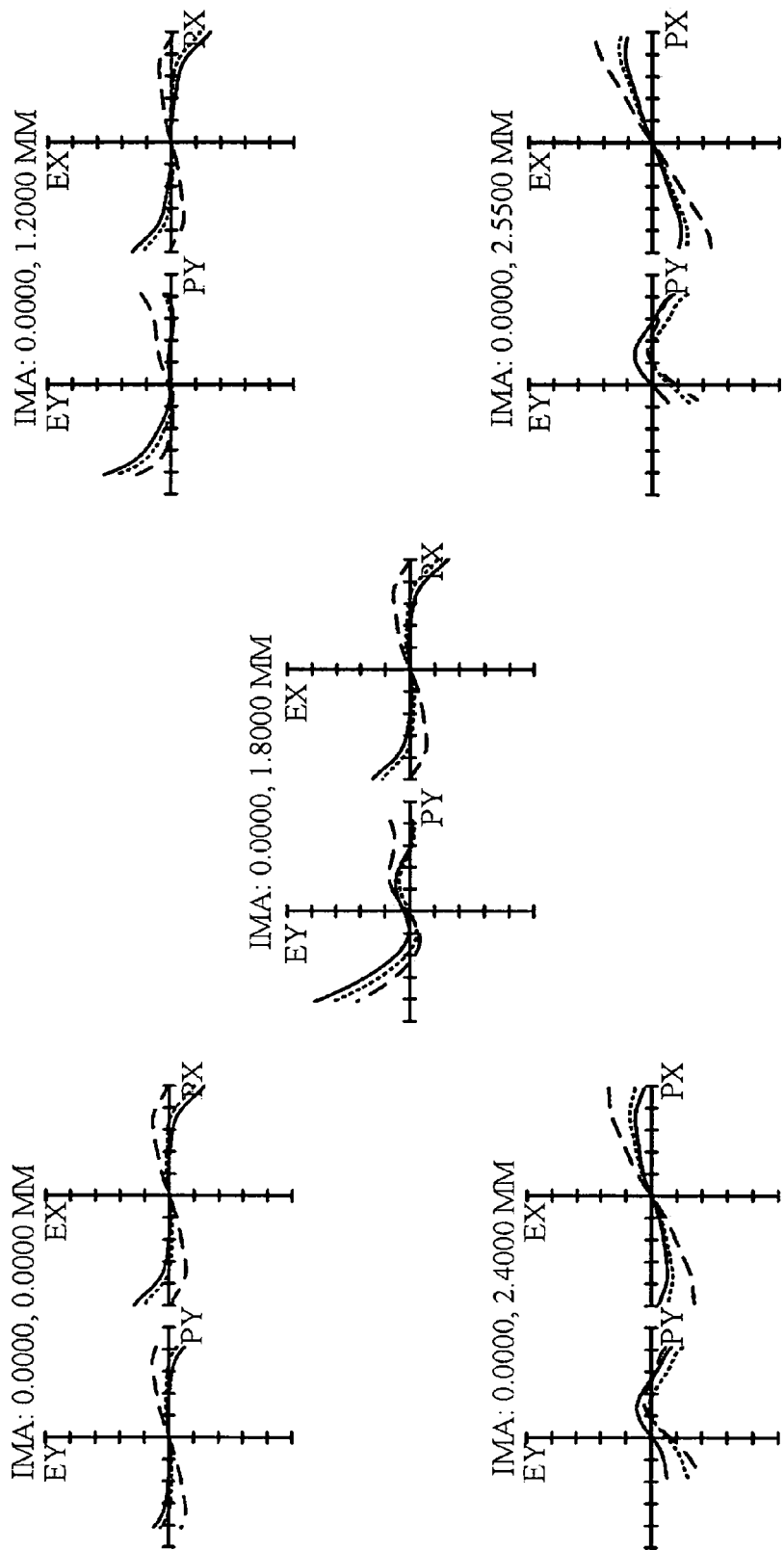
Figures 10C, 10D:
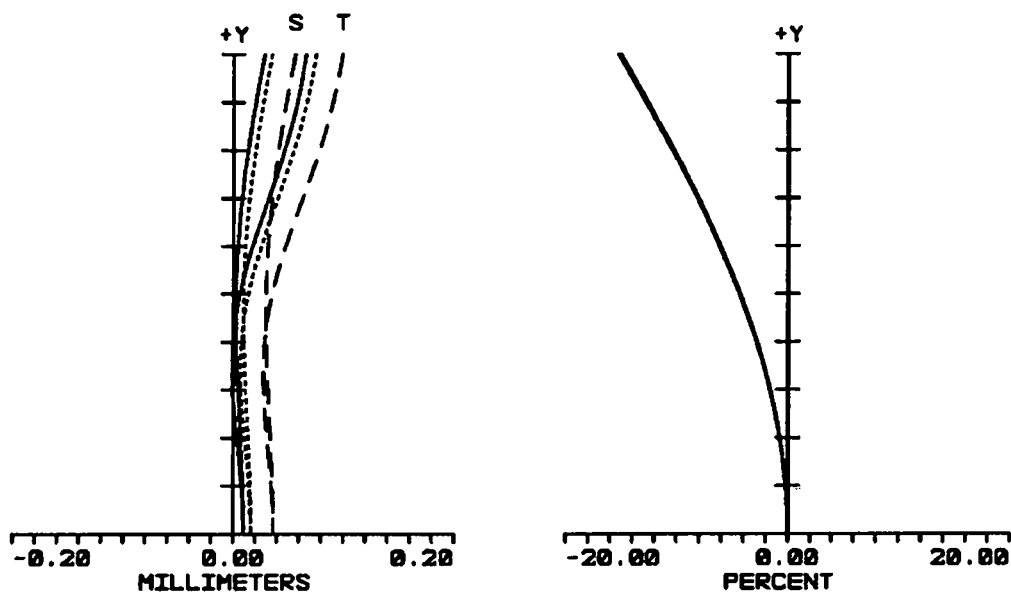
Figure 10E:
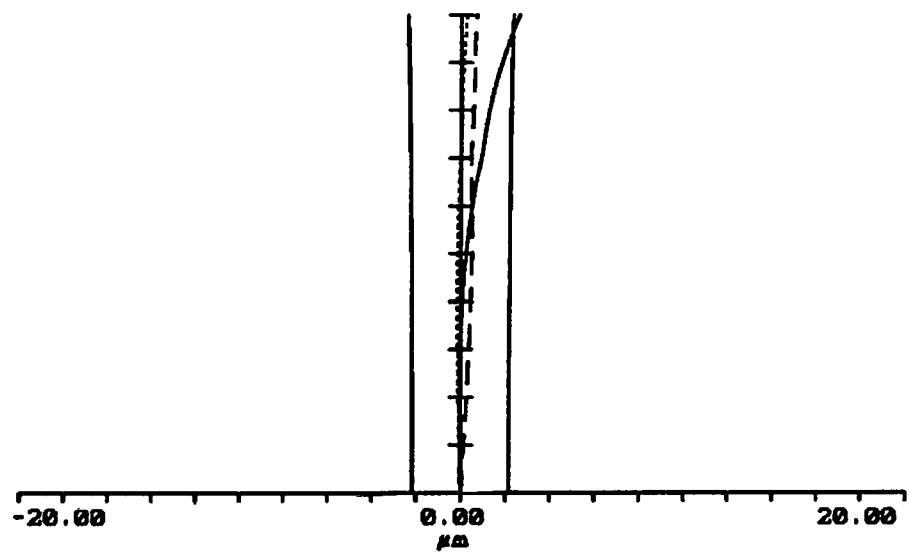
Figure 11A:
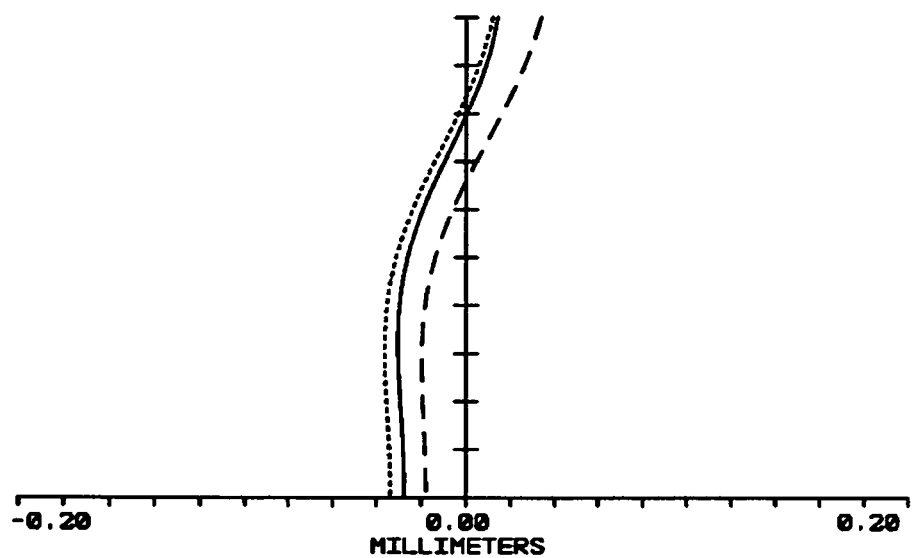
Figure 11B:
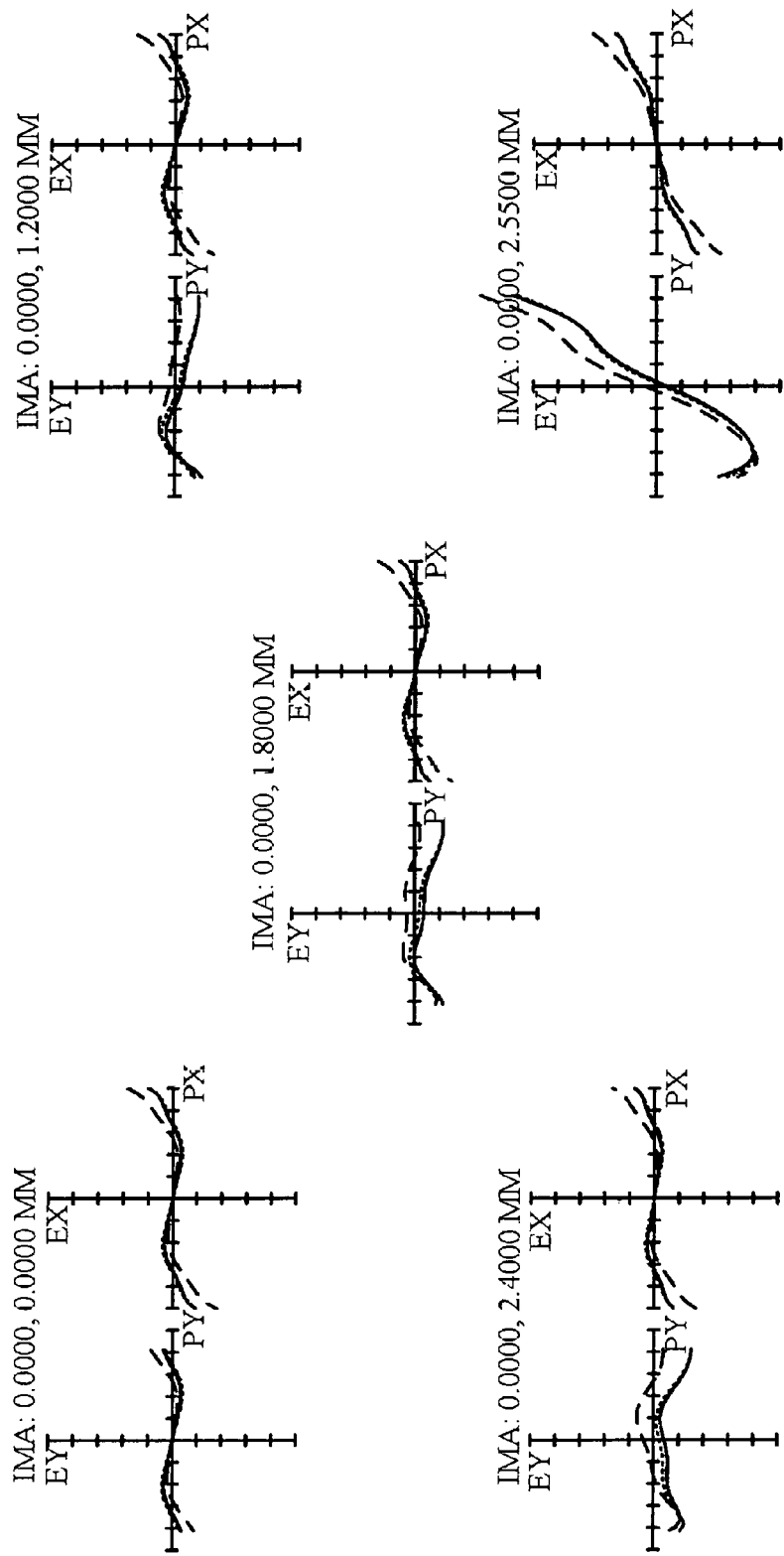
Figure 12A:
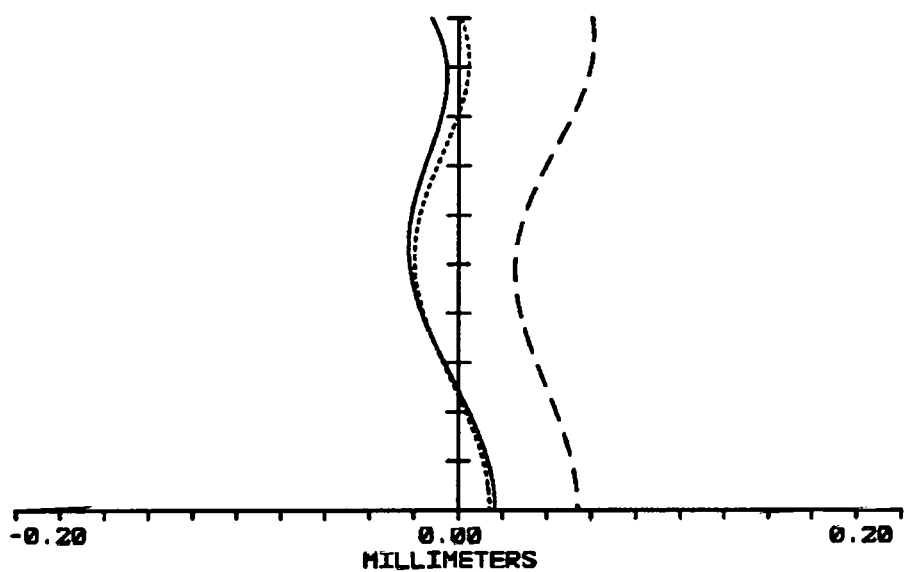
FIGS. 12A to 12E are diagrams showing the optical performance including spherical aberration, comatic aberration, field curvature, distortion, and lateral color of the zoom lens of the second embodiment of the present invention at the telephoto end.
Figure 12B:
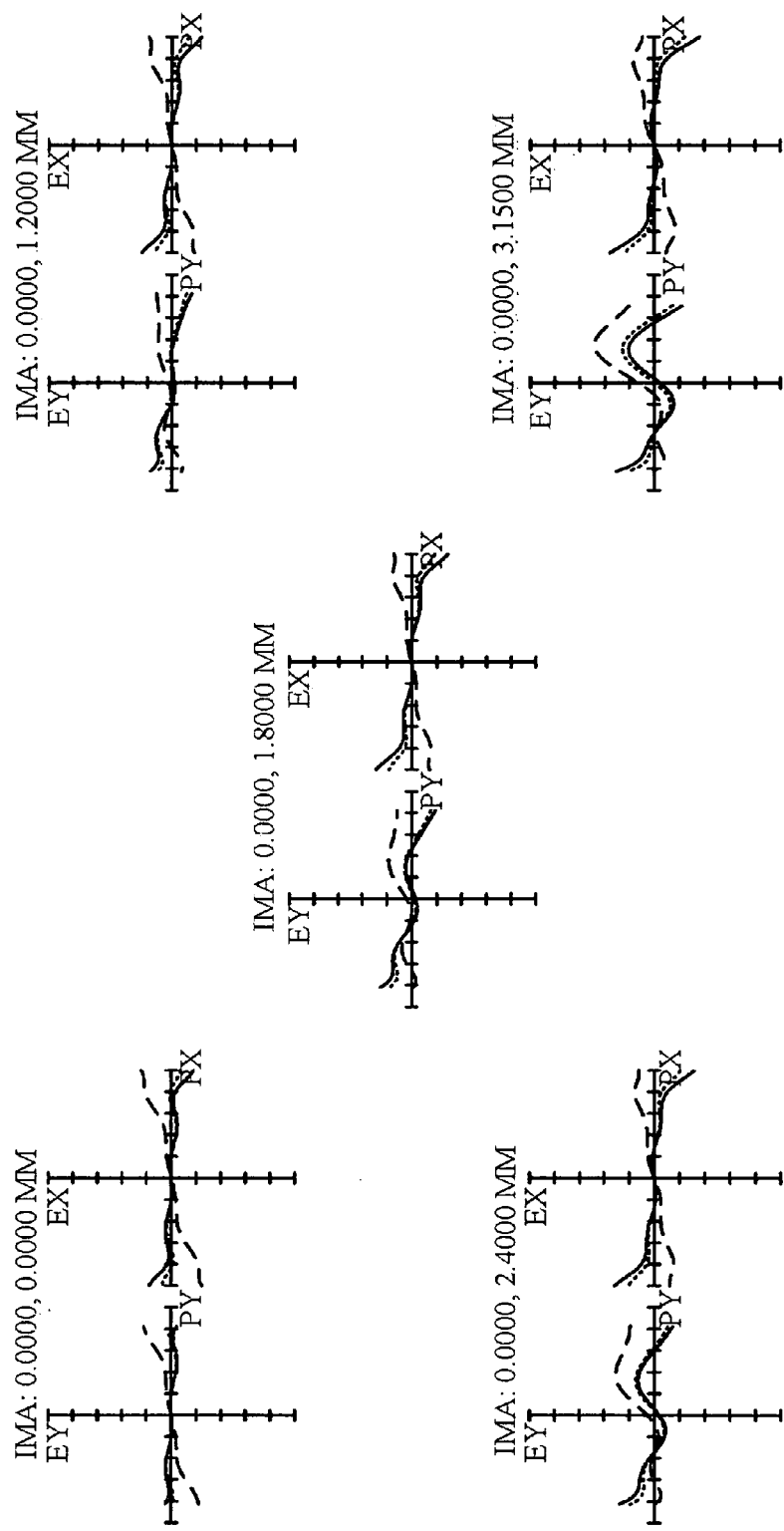
Figure 12C:
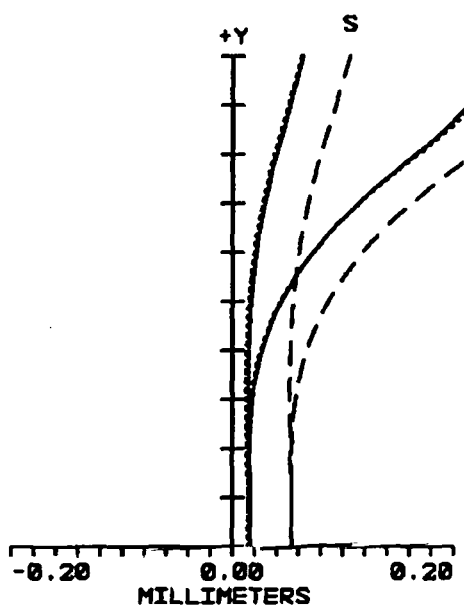
Figure 12D:
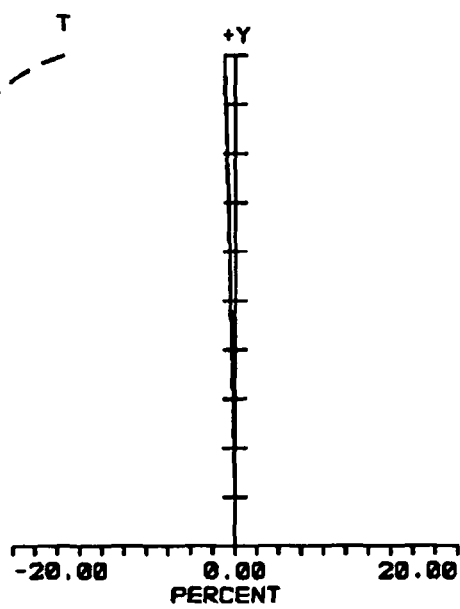
Figure 12E:
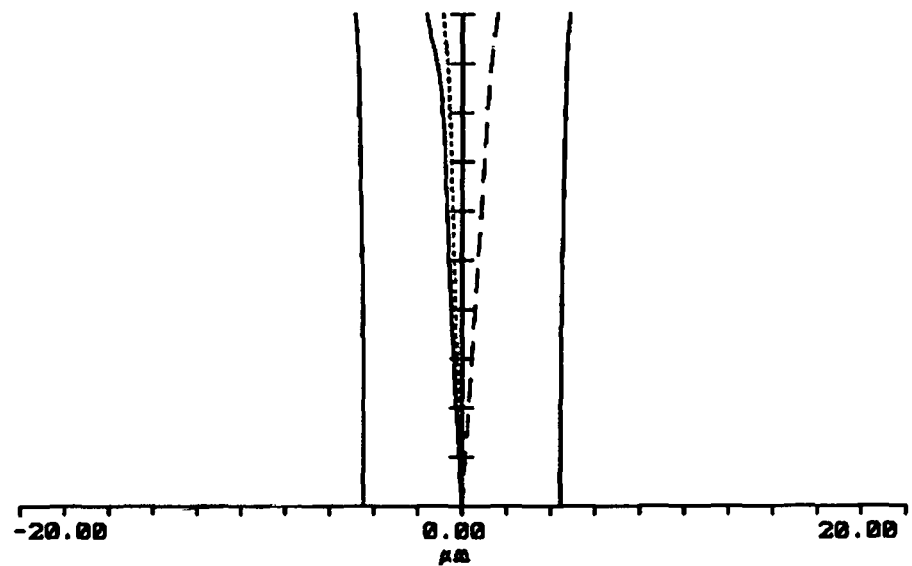
Figure 13:
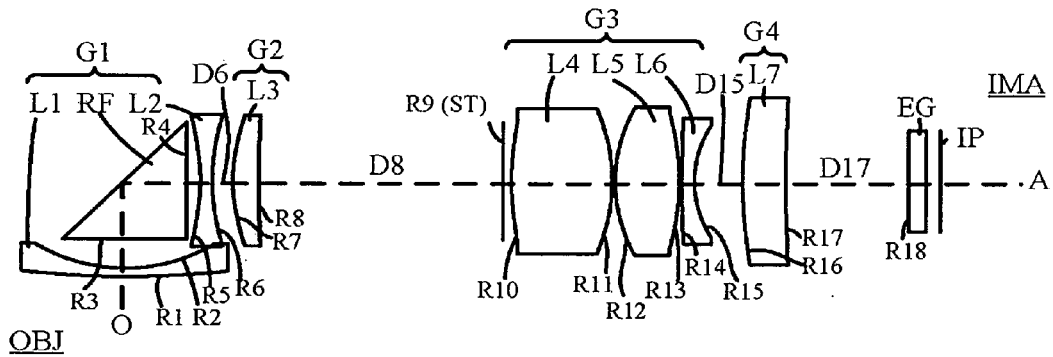
FIG. 13 is a schematic diagram showing an optical arrangement of a zoom lens at the wide-angle end in accordance with a third embodiment of the present invention.
Figure 14:
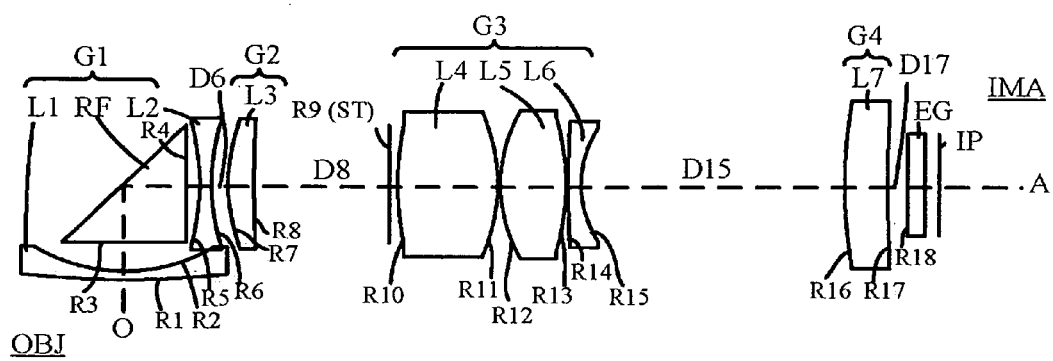
FIG. 14 is a schematic diagram showing an optical arrangement of the zoom lens at the medium-angle end in accordance with the third embodiment of the present invention.
Figure 15:
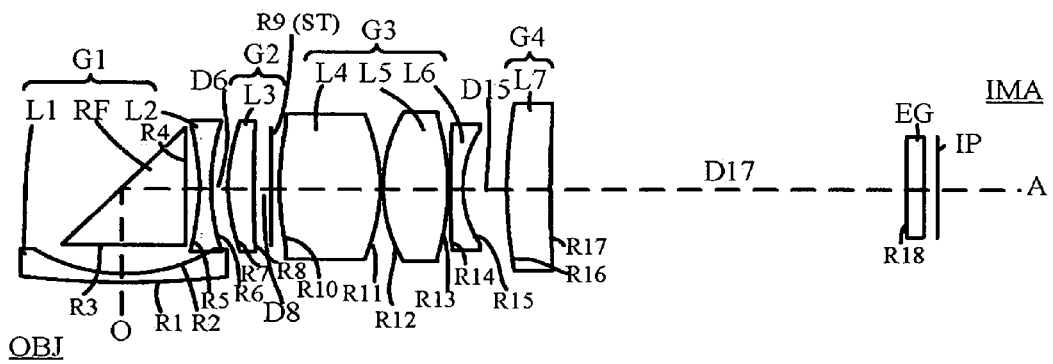
FIG. 15 is a schematic diagram showing an optical arrangement of the zoom lens at the telephoto end in accordance with the third embodiment of the present invention.
Figure 16A:
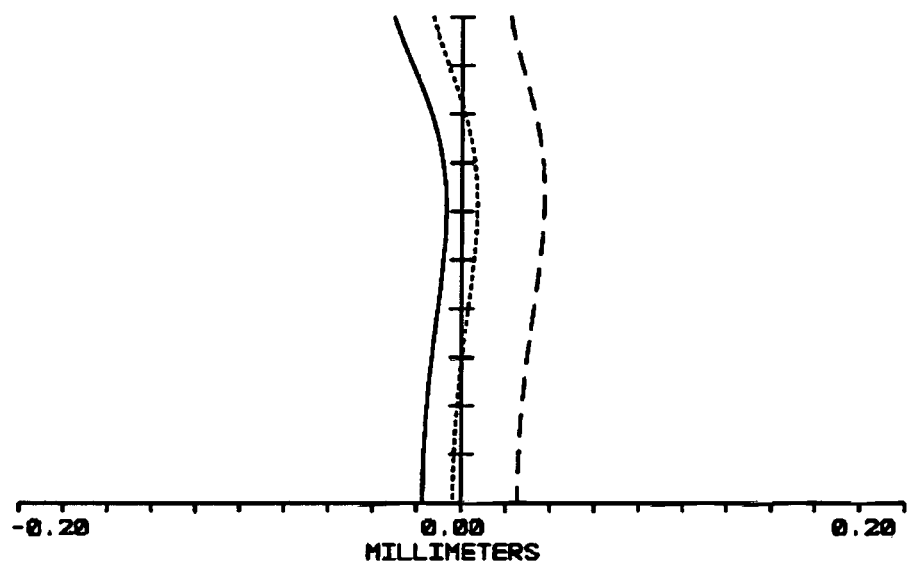
FIGS. 16A to 16E are diagrams showing the optical performance including spherical aberration, comatic aberration, field curvature, distortion, and lateral color of the zoom lens of the third embodiment of the present invention at the wide-angle end.
Figure 16B:
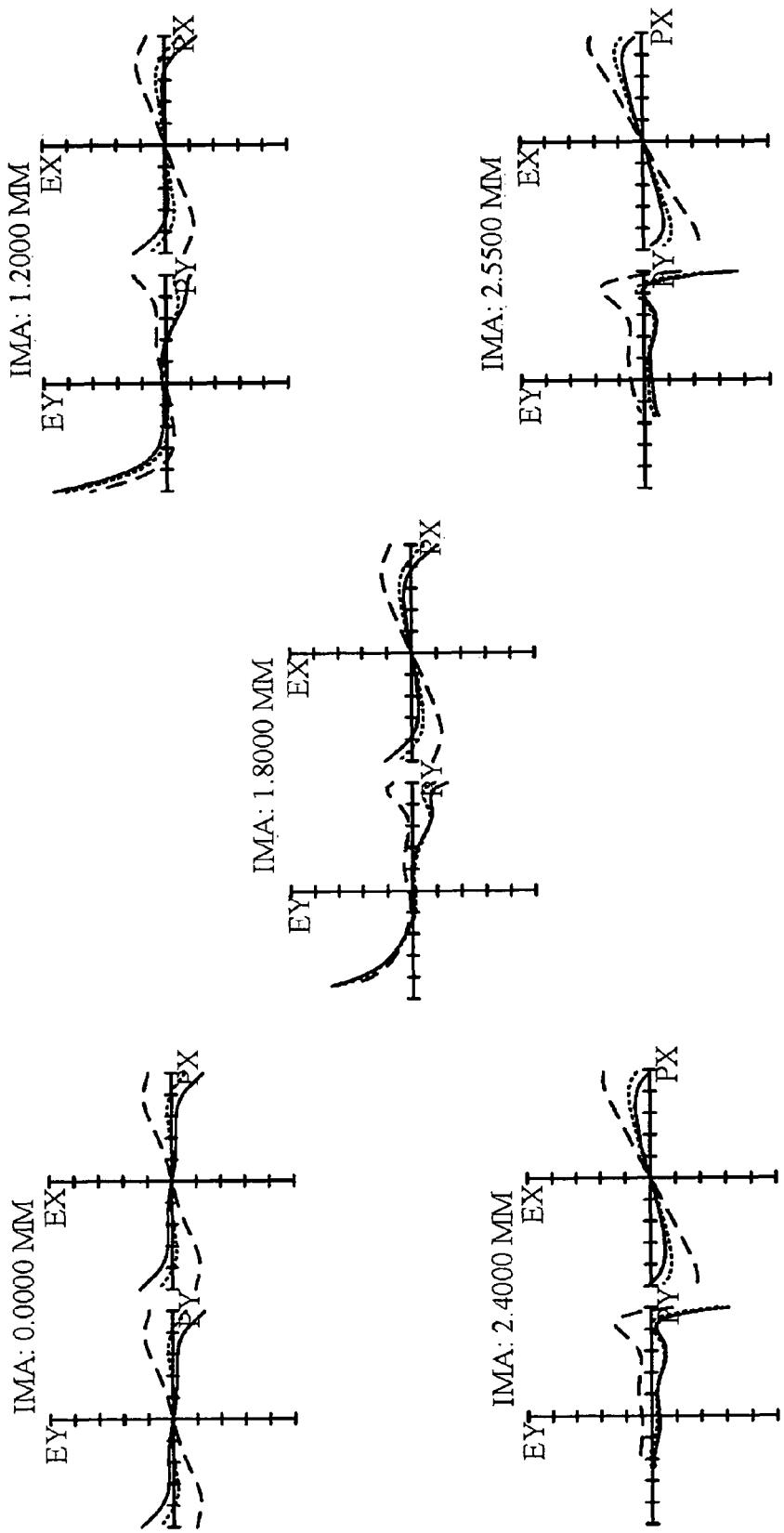
Figure 16C:
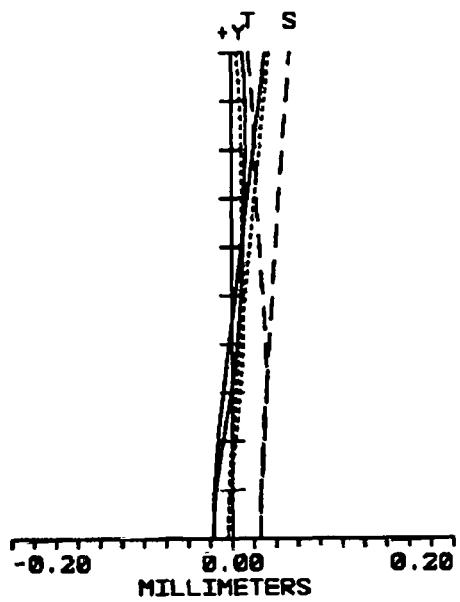
Figure 16D:
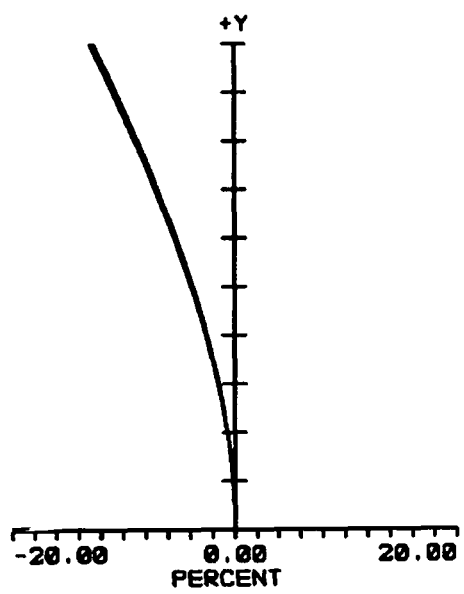
Figure 16E:
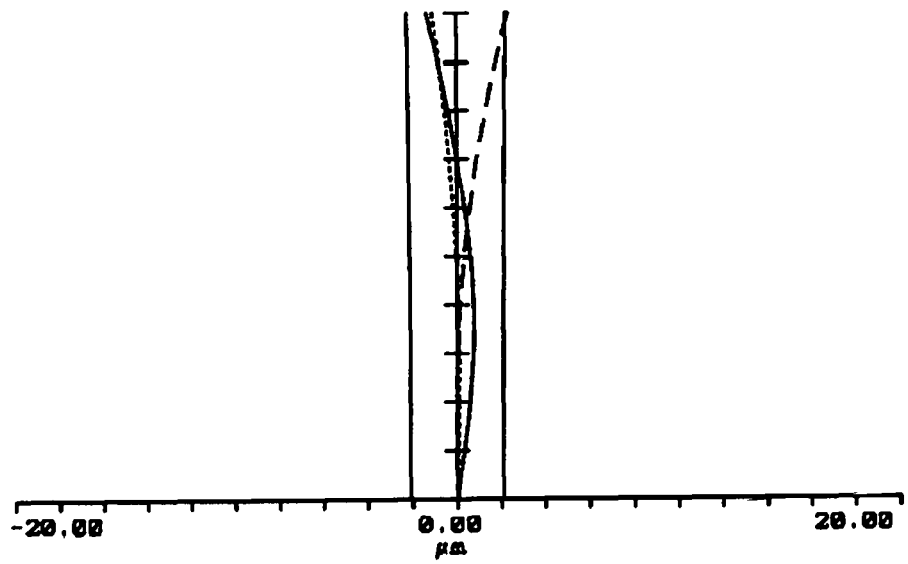
Figure 17A:
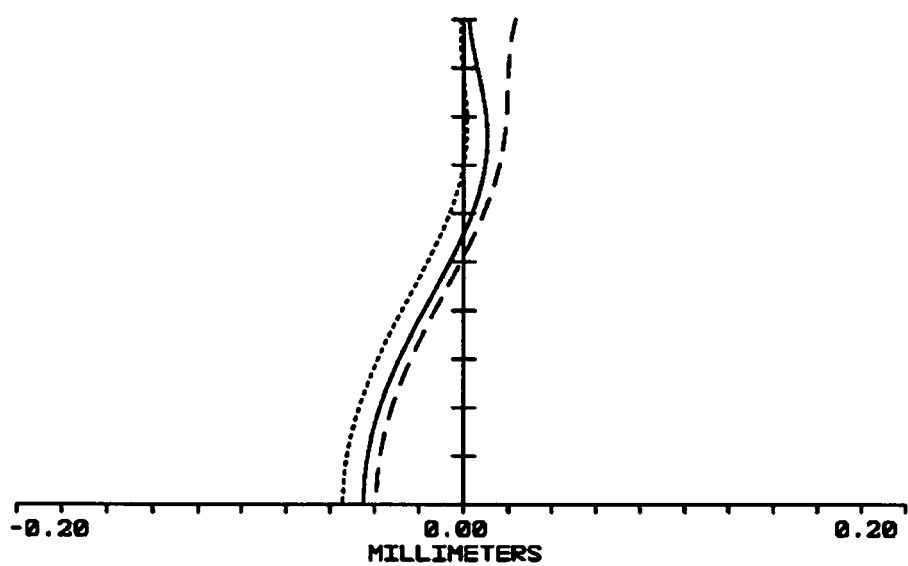
FIGS. 17A to 17E are diagrams showing the optical performance including spherical aberration, comatic aberration, field curvature, distortion, and lateral color of the zoom lens of the third embodiment of the present invention at the medium-angle end.
Figure 17B:
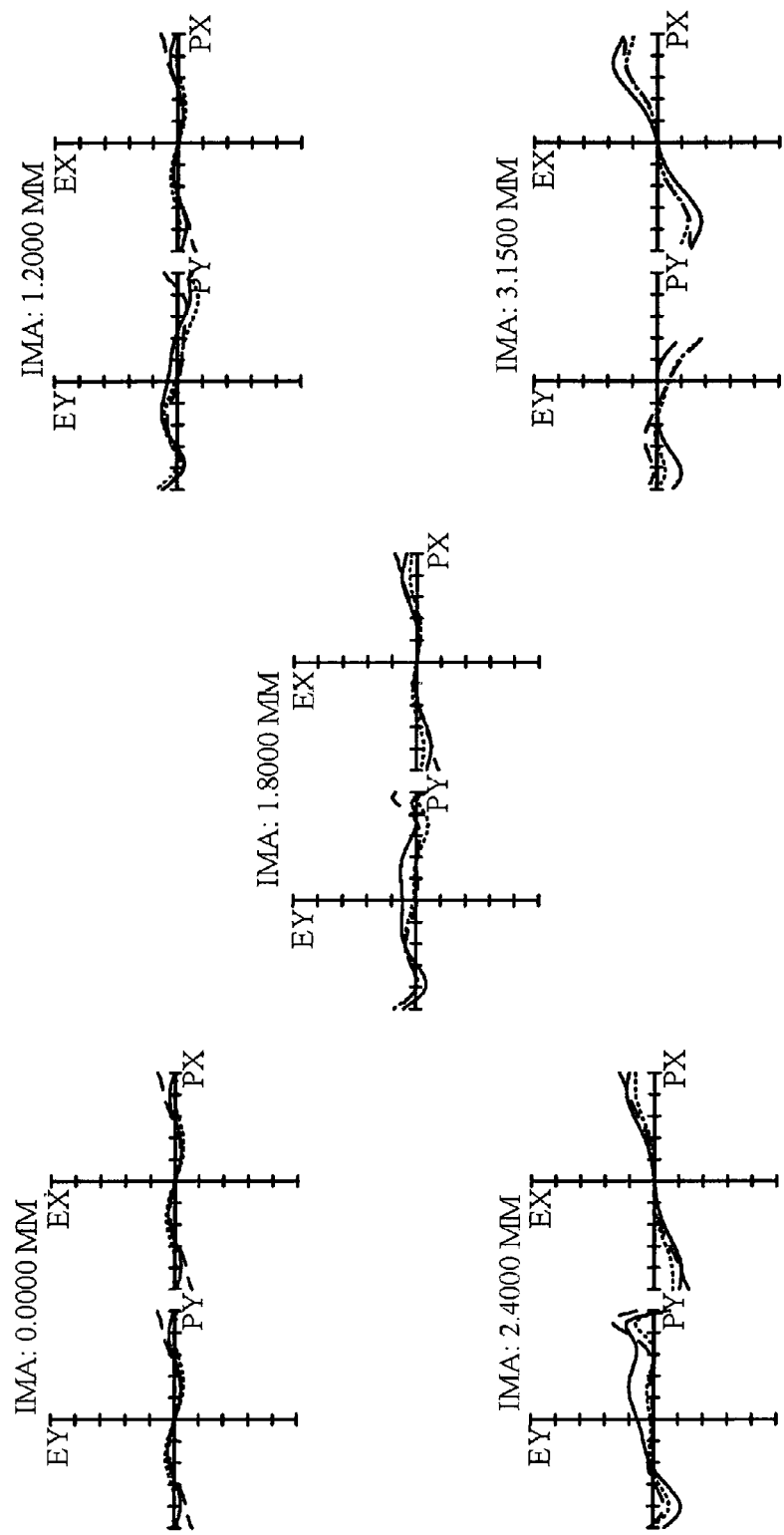
Figure 17C:
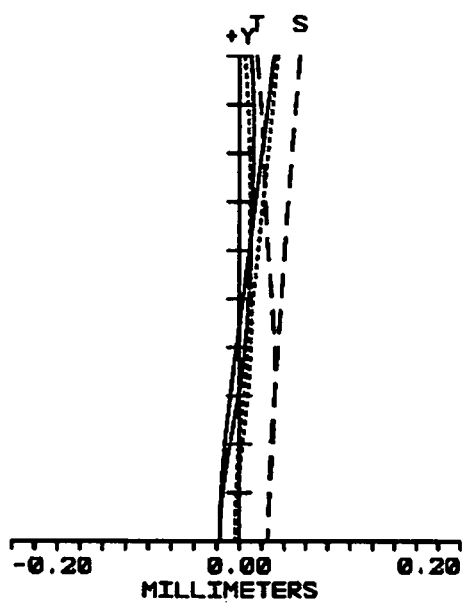
Figure 17D:
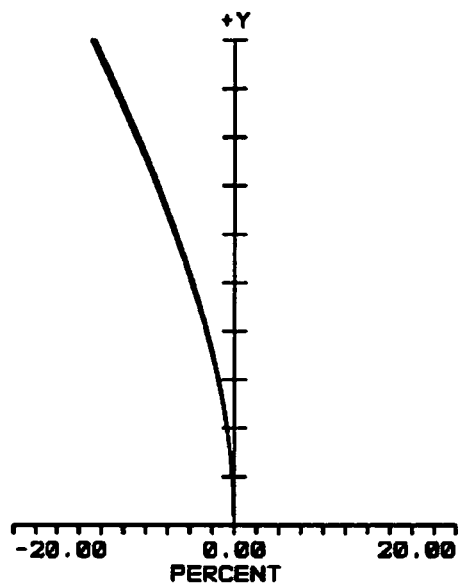
Figure 17E:
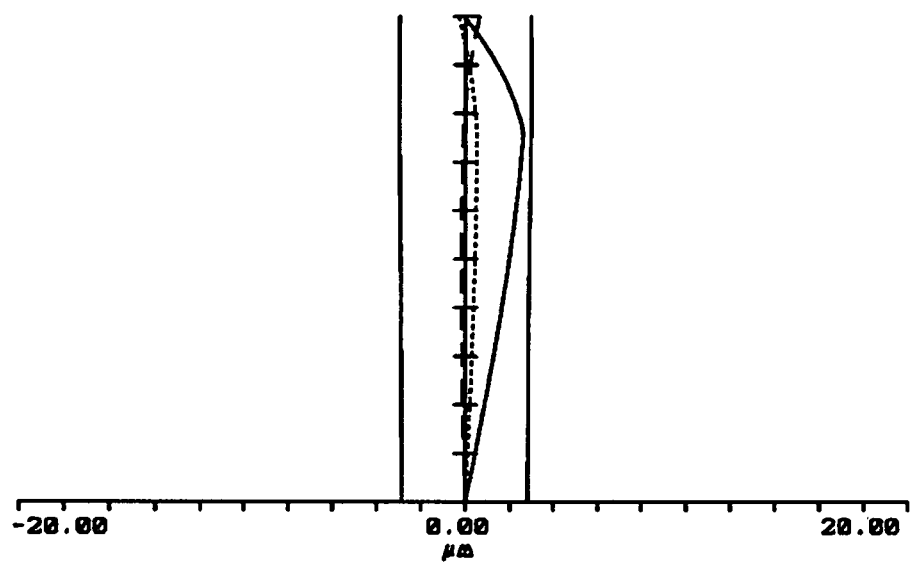
Figure 18A:
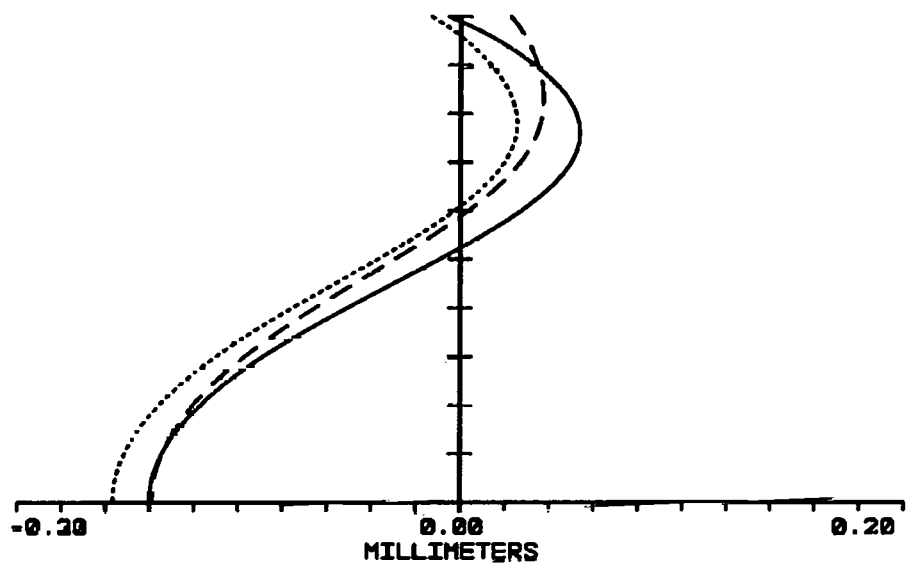
FIGS. 18A to 18E are diagrams showing the optical performance including spherical aberration, comatic aberration, field curvature, distortion, and lateral color of the zoom lens of the third embodiment of the present invention at the telephoto end.
Figure 18B:
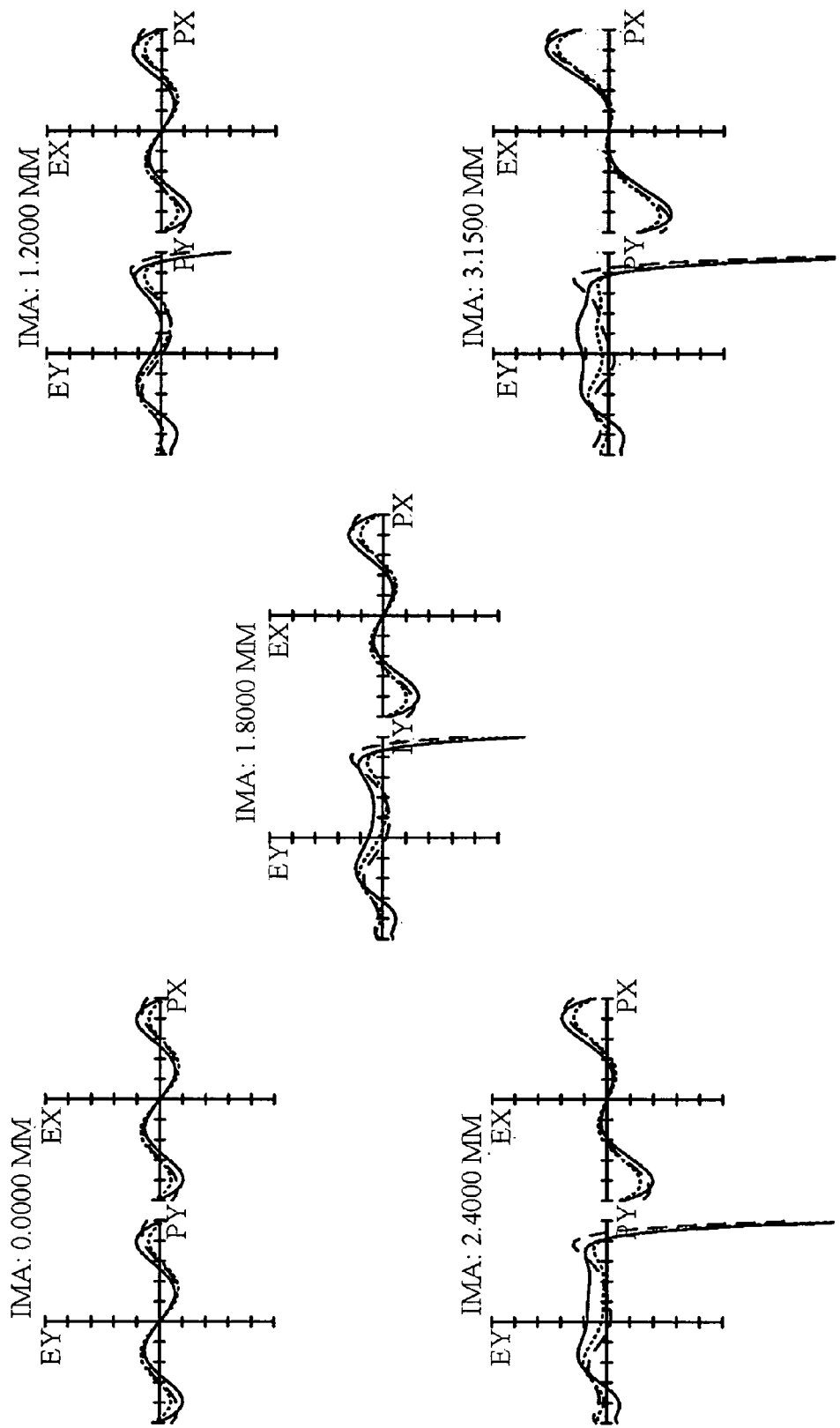
Figure 18C:
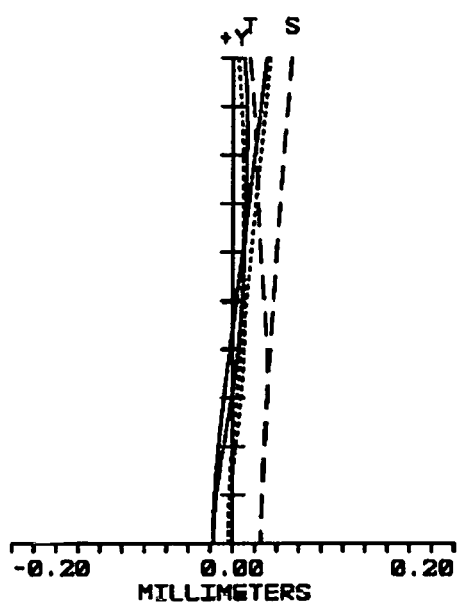
Figure 18D:
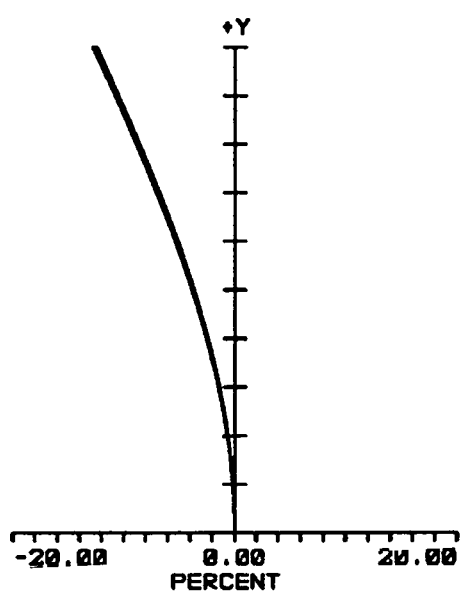
Figure 18E:
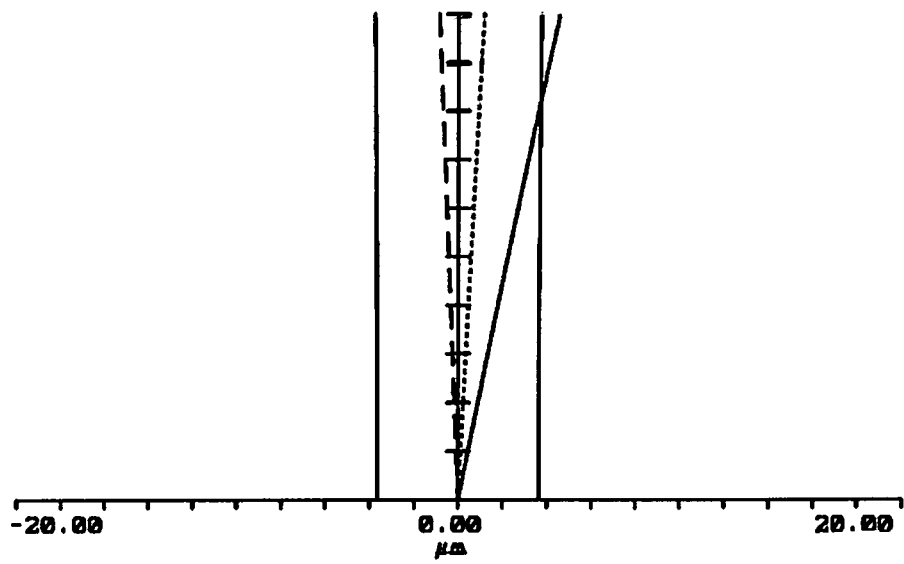

The zoom lens of the present invention is utilized for forming an image of a target object onto an image sensor such as CCD (Charge-Coupled Device) and CMOS (Complementary Metal-Oxide-Semiconductor), and is applicable to DSC (Digital Still Camera), DVC (Digital Video Camcorder), a personal information terminal (e.g., a mobile phone, a smart phone, and a tablet), EDR (Event Data Recorder), a surveillance apparatus, or other electronic apparatuses equipped with a camera or a camcorder. The basic structure of the zoom lens of the present invention is illustrated by FIGS. 1 to 3 (serving as a first embodiment), FIGS. 7 to 9 (serving as a second embodiment), and FIGS. 13 to 15 (serving as a third embodiment), where "OA" represents the optical axis of the zoom lens, "OBJ" represents the object side, "IMG" represents the image side, "ST" represents an aperture stop, "EG" represents a glass member, and "IP" represents an image plane. FIGS. 1 to 3 are schematic diagrams showing optical arrangements of a zoom lens respectively at a wide-angle end, a medium-angle end, and a telephoto end in accordance with the first embodiment of the present invention. Similarly, FIGS. 7 to 9 are schematic diagrams showing optical arrangements of a zoom lens respectively at the wide-angle end, the medium-angle end, and the telephoto end in accordance with the second embodiment of the present invention. Similarly, FIGS. 13 to 15 are schematic diagrams showing optical arrangements of a zoom lens respectively at the wide-angle end, the medium-angle end, and the telephoto end in accordance with the third embodiment of the present invention.

Please refer to FIGS. 1 to 3, FIGS. 7 to 9, and FIGS. 13 to 15. The zoom lens of the present invention comprises, in order from the object side "OBJ" to the image side "IMA" along the optical axis "OA", a first lens group G1 (comprising a reflection element or a reflection member "RF" such as a prism), a second lens group G2, the aperture stop "ST", a third lens group G3, a fourth lens group G4, and the glass member "EG" exemplarily representing a low-pass filter made of glass. The reflection element or the reflection member "RF" is used to change the direction of light. It is noted that the various embodiments of the present invention and their corresponding drawings are exemplified by a periscope lens, but the present invention is not limited thereto. Those having similar or the same optical structure as the zoom lens of the present invention are within the scope of the present invention.

The first lens group G1, the second lens group G2, the third lens group G3, and the fourth lens group G4 respectively have negative refractive power, positive refractive power, positive refractive power, and positive refractive power. In zooming or focusing, the first lens group G1 is stationary and the second lens group G2, the third lens group G3, and the fourth lens group G4 move along the optical axis "OA", and they construct an inner zoom lens. In the zoom lens of the present invention, zooming is carried out mainly by moving the third lens group G3 and the fourth lens group G4 along the optical axis "OA" and focusing is accomplished mainly by moving the second lens group G2.

Specifically, in zooming from the wide-angle end to the telephoto end, the first lens group G1 is stationary, the third lens group G3 moves toward the object side "OBJ" along the optical axis "OA", and the fourth lens group G4 moves toward the image side "IMA" along the optical axis "OA" such that the variable distance D13 between the third lens group G3 and the fourth lens group G4 is increased, the variable distance D6 between the second lens group G2 and the aperture stop "ST" of the third lens group G3 is decreased, and the variable distance D15 between the fourth lens group G4 and the glass member "EG" is decreased (see the first embodiment depicted in FIGS. 1 to 3 and the second embodiment depicted in FIGS. 7 to 9). When the third lens group G3 moves, the aperture stop "ST" moves along therewith. Also, the ratio of the variable distance between the first lens group G1 and the second lens group G2 at the wide-angle end to the variable distance between the first lens group G1 and the second lens group G2 at the medium-angle end is disproportional to the ratio of the variable distance between the first lens group G1 and the second lens group G2 at the medium-angle end to the variable distance between the first lens group G1 and the second lens group G2 at the telephoto end. In another embodiment (as shown in the third embodiment depicted in FIGS. 13 to 15), in the zooming, the third lens group G3 moves toward the object side "OBJ" along the optical axis "OA" and the fourth lens group G4 may move toward the image side "IMA" and then toward the object side "OBJ" along the optical axis "OA" such that the variable distance D15 between the third lens group G3 and the fourth lens group G4 increases and then decreases.

In the zoom lens of the present invention, focusing is accomplished mainly by moving the second lens group G2. During zooming from the wide-angle end to the telephoto end is performed, the second lens group G2 may move toward the image side "IMA" along the optical axis "OA" such that the variable distance between the second lens group G2 and the first lens group G1 is increased. In addition, the second lens group G2 may move alone to carry out the focusing after the zooming is accomplished.

In the zoom lens of the present invention, the ratio of the focal length f1 of the first lens group G1 to the focal length f2 of the second lens group G2 satisfies the following condition:

$$-0.5 \leq f1/f2 \leq 0.1 \quad (1)$$

The ratio of the focal length f3 of the third lens group G2 to the focal length f2 of the second lens group G2 satisfies the following condition:

$$0.3 \leq f3/f2 \leq 1 \quad (2)$$

The zoom lens of the present invention has a plurality of aspheric lenses. The shape of an aspheric lens may be expressed by the following formula:

$$z = \frac{ch^2}{1+[1-(k+1)c^2h^2]^{\frac{1}{2}}} + Ah^4 + Bh^6 + Ch^8 + Dh^{10},$$

where z represents the sag of a point on the aspheric surface at a height h distanced to a central axis of the lens; c is the curvature of the vertex; h represents a height of a point on the aspheric surface with respect to the central axis; k is the conic constant of the aspheric lens; and A, B, C, and D are respectively aspheric surface coefficients for fourth, sixth, eighth, and tenth order terms.

The zoom lens of the present invention will be further detailed with reference to the following three embodiments.

First Embodiment

Please refer to FIGS. 1 to 3, which are schematic diagrams showing optical arrangements of a zoom lens respectively at the wide-angle end, the medium-angle end, and the telephoto end in accordance with the first embodiment of the present invention. The first lens group G1 has negative refractive power, and is stationary when zooming or focusing is performed. The first lens group G1 comprises, in order from the object side "OBJ" to the image side "IMA" along the optical axis "OA", a bi-concave lens L1 having negative refractive power and a prism RF used to change the direction of light. The second lens group G2 comprises a meniscus convex lens L2 having positive refractive power, of which the convex surface faces the image side. The third lens group G3 have positive refractive power and comprises, in order from the object side "OBJ" to the image side "IMA", a bi-convex lens L3 having positive refractive power, a bi-convex lens L4 having positive refractive power, and a bi-concave lens L5 having negative refractive power. The hi-convex lens L4 and the bi-concave lens L5 can be cemented with each other to construct a compound lens. The fourth lens group G4 comprises a bi-convex lens L6 having positive refractive power.

Numerical values of the constituent optical elements of the zoom lens in accordance with the first embodiment of the present invention are shown in Table 1 below, where R represents the radius of curvature, D represents the thickness or the distance between adjacent elements, Nd represents the d-line refractive index, Vd represents the d-line Abbe number, and the surface index of the respective optical elements is numbered from the object side "OBJ". In addition, the bi-convex lens L4 and the bi-concave lens L5 are cemented with each other to construct a compound lens and the corresponding surfaces of these two lens L4 and L5 actually belong to a same surface (i.e., R12), and therefore the radius of curvature of this surface (i.e., R12) is indicated by a single value.

TABLE 1

| Surface Index | Radius of Curvature R (mm) | Thickness/ Distance D (mm) | Refractive Index (Nd) | Abbe No. (Vd) |
|---|---|---|---|---|
| R1 | −18.719181 | 0.30 | 1.883 | 40.76 |
| R2 | 5.73878665 | 0.84 | | |
| R3 | INF | 4.20 | 1.8348 | 42.7 |
| R4 | INF | 0.90 (D4) | | |
| R5 | −21.067029 | 0.90 | 1.7144 | 28.76 |
| R6 | −8.4468999 | 11.31 (D6) | | |
| R7 (ST) | INF | 0.00 | | |
| R8 (ST) | INF | 0.75 | | |

TABLE 1-continued

| Surface Index | Radius of Curvature R (mm) | Thickness/ Distance D (mm) | Refractive Index (Nd) | Abbe No. (Vd) |
|---|---|---|---|---|
| R9 | 5.69364565 | 3.49 | 1.48749 | 70.2 |
| R10 | −7.4907587 | 0.12 | | |
| R11 | 6.26214507 | 2.26 | 1.497 | 81.6 |
| R12 | −20.324677 | 0.44 | 1.9036 | 31.3 |
| R13 | 4.13849505 | 0.89 (D13) | | |
| R14 | 9.51200767 | 1.50 | 1.52528 | 55.95 |
| R15 | −32.91005 | 5.15 (D15) | | |
| R16 | INF | | | |

As below, Table 2 shows the variable distance D4 between the first lens group G1 and the second lens group G2, the variable distance D6 between the second lens group G2 and the aperture stop "ST" of the third lens group G3, the variable distance D13 between the third lens group G3 and the fourth lens group G4, the variable distance D15 between the fourth lens group G4 and the glass member "EG", and the focal length (f) and the corresponding F-number (Fno) of the entire optical system when the zoom lens of the first embodiment of the present invention is at the wide angle end (W), the medium-angle end (M), and the telephoto end (T), respectively. As can be seen from Table 2, the ratio (0.9035/1.5006) of the variable distance D4 between the first lens group G1 and the second lens group G2 at the wide-angle end to the variable distance D4 between the first lens group G1 and the second lens group G2 at the medium-angle end is disproportional to the ratio (1.5006/1.5545) of the variable distance D4 between the first lens group G1 and the second lens group G2 at the medium-angle end to the variable distance D4 between the first lens group G1 and the second lens group G2 at the telephoto end.

TABLE 2

| | Distance between 1st and 2nd groups (D4) | Distance between 2nd and 3rd groups (D6) | Distance between 3rd and 4th groups (D13) | Distance between 4th groups and the image (D15) | f | Fno. |
|---|---|---|---|---|---|---|
| W | 0.9035 | 11.3086 | 0.8923 | 5.15 | 3.85 | 3.0000 |
| M | 1.5006 | 6.0324 | 8.2272 | 2.505 | 6.48 | 4.3000 |
| T | 1.5545 | 0.9899 | 14.1096 | 1.608 | 10.89 | 6.0000 |

As shown in Table 3 below, in the zoom lens of the first embodiment of the present invention, the ratio of the focal length f1 of the first lens group G1 to the focal length f2 of the second lens group G2 is −0.26 and the ratio of the focal length f3 of the third lens group G3 to the focal length f2 of the second lens group G2 is 0.55.

TABLE 3

| f1 | f3 | f2 | f3/f2 | f1/f2 |
|---|---|---|---|---|
| −4.945 | 10.57 | 19.17 | 0.55 | −0.25795514 |

As below, Table 4 shows parameters of the respective aspheric surfaces of the zoom lens in accordance with the first embodiment of the present invention, where k is the conic constant and A, B, C, and D are respectively aspheric surface coefficients for fourth, sixth, eighth, and tenth order terms. As can be seen from Table 4, the zoom lens of the first embodiment of the present invention has five aspheric surfaces, that is, the object-side surface R5 of the meniscus convex lens L2 of the second lens group G2, the object-side surface R9 and the image-side surface R10 of the bi-convex lens L3 of the third lens group G3, and the object-side surface R14 and the image-side surface R15 of the bi-convex lens L6 of the fourth lens group G4. Correction on the aberration is dominated by the aspheric surfaces at the two sides of the bi-convex lens L3 of the third lens group G3.

TABLE 4

| Surface Index | k | A | B | C | D |
|---|---|---|---|---|---|
| R5 | 0 | 0.00029338 | 1.147E−05 | −1.9003E−06 | 1.6384E−07 |
| R9 | 0 | −0.00098152 | −7.577E−05 | 8.2409E−06 | −7.2677E−07 |
| R10 | 0 | 0.00057808 | −5.2687E−05 | 4.3602E−06 | −4.3186E−07 |
| R14 | 0 | −4.6788E−05 | 5.212E−06 | −1.4955E−06 | 1.0352E−07 |
| R15 | 0 | 4.6788E−05 | −5.212E−06 | 1.4955E−06 | −1.0352E−07 |

FIGS. 4A to 4E are diagrams showing the optical performance including spherical aberration, comatic aberration, field curvature, distortion, and lateral color of the zoom lens of the first embodiment of the present invention at the wide-angle end. FIGS. 5A to 5E are diagrams showing the corresponding optical performance of the zoom lens of the first embodiment of the present invention at the medium-angle end. FIGS. 6A to 6E are diagrams showing the corresponding optical performance of the zoom lens of the first embodiment of the present invention at the telephoto end. In the diagrams, the solid lines indicate that the wavelength of light is 486 nm, the dash lines indicate that the wavelength of light is 656 nm, and the dot lines indicate that the wavelength of light is 546 nm. As can be seen from the performance diagrams, the zoom lens of the first embodiment of the present invention can correct the various types of aberration and thus has a better optical performance.

Second Embodiment

Please refer to FIGS. 7 to 9, which are schematic diagrams showing optical arrangements of a zoom lens respectively at the wide-angle end, the medium-angle end, and the telephoto end in accordance with the second embodiment of the present invention. The constituent lenses of the respective lens groups G1, G2, G3, and G4 of the second embodiment of the present invention are the same as that of the first embodiment but the numerical values and characteristics of the lenses of the second embodiment are different from that of the first embodiment. Particularly, the numerical value of the lens L6 of the fourth lens group G4 of the second embodiment is different from that of the lens L6 of the first embodiment.

Numerical values of the constituent optical elements of the zoom lens in accordance with the second embodiment of the present invention are shown in Table 5 below. The bi-convex lens L4 and the bi-concave lens L5 construct a compound lens, and therefore the radius of curvature of the joint surface (i.e., R12) of the two lenses L4 and L5 is indicated by a single value.

TABLE 5

| Surface Index | Radius of Curvature R (mm) | Thickness/ Distance D (mm) | Refractive Index (Nd) | Abbe No. (Vd) |
|---|---|---|---|---|
| R1 | −11.617 | 0.300 | 1.8830 | 40.76 |
| R2 | 6.969 | 0.651 | | |
| R3 | INF | 4.200 | 1.8348 | 42.7 |
| R4 | INF | 0.916 (D4) | | |
| R5 | −20.254 | 0.930 | 1.7144 | 28.76 |
| R6 | −7.945 | 11.348 (D6) | | |
| R7 (ST) | INF | 0.000 | | |
| R8 (ST) | INF | 0.751 | | |
| R9 | 5.704 | 3.491 | 1.4875 | 70.2 |
| R10 | −8.075 | 0.115 | | |
| R11 | 6.347 | 2.263 | 1.4970 | 81.6 |
| R12 | −22.216 | 0.436 | 1.9036 | 31.3 |
| R13 | 4.195 | 0.903 (D13) | | |
| R14 | 17.260 | 1.596 | 1.5253 | 55.95 |
| R15 | −10.973 | 5.551 (D15) | | |
| R16 | INF | | | |

As below, Table 6 shows the variable distances between the respective lens groups, and the focal length (f) and the corresponding F-number (Fno) of the entire optical system when the zoom lens of the second embodiment of the present invention is at the wide-angle end (W), the medium-angle end (M), and the telephoto end (T), respectively. As can be seen from Table 6, the ratio (0.9162/1.4108) of the variable distance D4 between the first lens group G1 and the second lens group G2 at the wide-angle end to the variable distance D4 between the rust lens group G1 and the second lens group G2 at the medium-angle end is disproportional to the ratio (1.4108/1.6509) of the variable distance D4 between the first lens group G1 and the second lens group G2 at the medium-angle end to the variable distance D4 between the first lens group G1 and the second lens group G2 at the telephoto end.

TABLE 6

| | Distance between 1st and 2nd groups (D4) | Distance between 2nd and 3rd groups (D6) | Distance between 3rd and 4th groups (D13) | Distance between 4th groups and the image (D15) | f | Fno. |
|---|---|---|---|---|---|---|
| W | 0.9162 | 11.3476 | 0.9026 | 5.5510 | 3.99 | 3.00 |
| M | 1.4108 | 5.8048 | 7.9812 | 3.523 | 6.7 | 4.28 |
| T | 1.6509 | 0.9839 | 14.4037 | 1.69 | 11.26 | 6.15 |

As shown in Table 7 below, in the zoom lens of the second embodiment of the present invention, the ratio of the focal length f1 of the first lens group G1 to the focal length f2 of the second lens group G2 is −0.28 and the ratio of the focal length f3 of the third lens group G3 to the focal length f2 of the second lens group G2 is 0.63.

TABLE 7

| f1 | f3 | f2 | f3/f2 | f1/f2 |
|---|---|---|---|---|
| −4.895 | 11.11 | 17.74 | 0.63 | −0.2759301 |

As below, Table 8 shows parameters of the respective aspheric surfaces of the zoom lens in accordance with the second embodiment of the present invention. As can be seen from Table 8, the aspheric surfaces of the second embodiment of the present invention are the same as that of the first embodiment, that is, R5, R9, R10, R14, and R15. Correction on the aberration is dominated by the aspheric surfaces R9 and R10 at the two sides of the bi-convex lens L3 of the third lens group G3.

TABLE 8

| Surface Index | k | A | B | C | D |
|---|---|---|---|---|---|
| R5 | 0 | 0.000365693 | −2.1566E−05 | 3.69722E−06 | −1.6974E−07 |
| R9 | 0 | −0.00089129 | −9.8902E−05 | 1.03991E−05 | −8.0881E−07 |
| R10 | 0 | 0.000587821 | −0.0001279 | 1.59952E−05 | −1.1136E−06 |
| R14 | 0 | −0.00013446 | −0.00011594 | 3.0487E−06 | −7.4868E−07 |
| R15 | 0 | 7.98624E−05 | −5.1487E−05 | −7.3157E−06 | −5.7882E−08 |

FIGS. 10A to 10E are diagrams showing the optical performance including spherical aberration, comatic aberration, field curvature, distortion, and lateral color of the zoom lens of the second embodiment of the present invention at the wide-angle end. FIGS. 11A to 11E are diagrams showing the corresponding optical performance of the zoom lens of the second embodiment of the present invention at the medium-angle end. FIGS. 12A to 12E are diagrams showing the corresponding optical performance of the zoom lens of the second embodiment of the present invention at the telephoto end. In the diagrams, the solid lines indicate that the wavelength of light is 486 nm, the dash lines indicate that the wavelength of light is 656 nm, and the dot lines indicate that the wavelength of light is 546 nm. As can be seen from the performance diagrams, the zoom lens of the second embodiment of the present invention can correct the various types of aberration and thus has a better optical performance.

Third Embodiment

Please refer to FIGS. 13 to 15, which are schematic diagrams showing optical arrangements of a zoom lens respectively at the wide-angle end, the medium-angle end, and the telephoto end in accordance with the third embodiment of the present invention. The first lens group G1 has negative refractive power, and is stationary when zooming or focusing is performed. The first lens group G1 comprises, in order from the object side "OBJ" to the image side "IMA" along the optical axis "OA", a meniscus concave lens L1 having negative refractive power, a prism RF used to change the direction of light, and a bi-concave lens L2 having negative refractive power. The convex surface of the meniscus concave lens L1 faces the object side. The second lens group G2 comprises a meniscus convex lens L3 having positive refractive power, of which the convex surface faces the object side. The third lens group G3 has positive refractive power and comprises, in order from the object side "OBJ" to the image side "IMA", a bi-convex lens L4 having positive refractive power, a bi-convex lens L5 having positive refractive power, and a meniscus concave lens L6 having negative refractive power. The convex surface of the meniscus concave lens L6 faces the object side. The fourth lens group G4 comprises a meniscus convex lens L7 having positive refractive power, of which the convex surface faces the object side.

Numerical values of the constituent optical elements of the zoom lens in accordance with the third embodiment of the present invention are shown in Table 9 below.

TABLE 9

| Surface Index | Radius of Curvature R (mm) | Thickness/ Distance D (mm) | Refractive Index (Nd) | Abbe No. (Vd) |
|---|---|---|---|---|
| R1 | 30.837 | 0.300 | 1.8830 | 40.76 |
| R2 | 5.719 | 1.037 | | |
| R3 | INF | 4.200 | 1.8348 | 42.7 |
| R4 | INF | 0.463 | | |
| R5 | −6.429 | 0.399 | 1.5253 | 55.95 |
| R6 | 7.890 | 0.696 (D6) | | |
| R7 | 5.694 | 0.883 | 1.7144 | 28.76 |
| R8 | 46.470 | 8.442 (D8) | | |
| R9 (ST) | INF | 0.297 | | |
| R10 | 9.572 | 3.491 | 1.4875 | 70.2 |
| R11 | −5.952 | 0.096 | | |
| R12 | 5.372 | 2.263 | 1.4970 | 81.6 |
| R13 | −8.893 | 0.088 | | |
| R14 | 47.477 | 0.436 | 1.9036 | 31.3 |
| R15 | 3.767 | 1.689 (D15) | | |
| R16 | 16.637 | 1.505 | 1.5253 | 55.95 |
| R17 | 41.987 | 5.161 (D17) | | |
| R18 | INF | | | |

As below, Table 10 shows the variable distance D6 between the first lens group G1 and the second lens group G2, the variable distance D8 between the second lens group G2 and the aperture stop "ST" of the third lens group G3, the variable distance D15 between the third lens group G3 and the fourth lens group G4, the variable distance D17 between the fourth lens group G4 and the glass member "EG", and the focal length (f) and the corresponding F-number (Fno) of the entire optical system when the zoom lens of the third embodiment of the present invention is at the wide-angle end (W), the medium-angle end (M), and the telephoto end (T), respectively. As can be seen from Table 10, the ratio (0.6963/0.5579) of the variable distance D6 between the first lens group G1 and the second lens group G2 at the wide-angle end to the variable distance D6 between the first lens group G1 and the second lens group G2 at the medium-angle end is disproportional to the ratio (0.5579/0.5697) of the variable distance D6 between the first lens group G1 and the second lens group G2 at the medium-angle end to the variable distance D6 between the first lens group G1 and the second lens group G2 at the telephoto end.

TABLE 10

| | Distance between 1st and 2nd groups (D4) | Distance between 2nd and 3rd groups (D6) | Distance between 3rd and 4th groups (D13) | Distance between 4th groups and the image (D15) | f | Fno. |
|---|---|---|---|---|---|---|
| W | 0.6963 | 8.4422 | 1.6895 | 5.1610 | 3.99 | 3.00 |
| M | 0.5579 | 4.6489 | 9.1949 | 1.5920 | 6.7 | 4.28 |
| T | 0.5697 | 0.5719 | 1.5276 | 13.3200 | 11.26 | 6.15 |

As shown in Table 11 below, in the zoom lens of the third embodiment of the present invention, the ratio of the focal length f1 of the first lens group G1 to the focal length f2 of the second lens group G2 is −0.39 and the ratio of the focal length f3 of the third lens group G3 to the focal length f2 of the second lens group G2 is 0.86.

TABLE 11

| f1 | f3 | f2 | f3/f2 | f1/f2 |
|---|---|---|---|---|
| −3.49 | 7.76 | 9 | 0.86 | −0.38778 |

As below, Table 12 shows parameters of the respective aspheric surfaces of the zoom lens in accordance with the third embodiment of the present invention. As can be seen from Table 12, the zoom lens of the third embodiment of the present invention has seven aspheric surfaces, that is, the object-side surface R5 of the bi-concave lens L2 of the first lens group G1, the object-side surface R7 of the meniscus convex lens L3 of the second lens group G2, the object-side surface R10 and the image-side surface R11 of the bi-convex lens L4 of the third lens group G3, the image-side surface R15 of the meniscus concave lens L6 of the third lens group G3, and the object-side surface R16 and the image-side surface R17 of the meniscus convex lens L7 of the fourth lens group G4. Correction on the aberration is dominated by the aspheric surfaces at the two sides of the bi-convex lens L4 of the third lens group G3.

TABLE 12

| Surface Index | k | A | B | C | D |
|---|---|---|---|---|---|
| R5 | 0 | 0.007638483 | −0.00099045 | 9.43935E−05 | −4.1904E−06 |
| R7 | 0 | −0.00478221 | 0.000533846 | −4.8449E−05 | 1.9457E−06 |
| R10 | 0 | −0.00144115 | −7.0045E−05 | 1.07311E−05 | −6.4522E−07 |
| R11 | 0 | 0.001470065 | −8.2365E−05 | 1.13419E−05 | −4.2666E−07 |
| R15 | 0 | −0.00021883 | 5.01641E−05 | 1.34483E−05 | 0 |
| R16 | 0 | 0.000554136 | −0.00017094 | 9.5469E−06 | 4.02515E−08 |
| R17 | 0 | 0.000482469 | −0.00014512 | 3.13911E−06 | 1.47088E−07 |

FIGS. 16A to 16E are diagrams showing the optical performance including spherical aberration, comatic aberration, field curvature, distortion, and lateral color of the zoom lens of the third embodiment of the present invention at the wide-angle end. FIGS. 17A to 17E are diagrams showing the corresponding optical performance of the zoom lens of the third embodiment of the present invention at the medium-angle end. FIGS. 18A to 18E are diagrams showing the corresponding optical performance of the zoom lens of the third embodiment of the present invention at the telephoto end. In the diagrams, the solid lines indicate that the wavelength of light is 486 nm, the dash lines indicate that the wavelength of light is 656 nm, and the dot lines indicate that the wavelength of light is 546 nm. As can be seen from the performance diagrams, the zoom lens of the third embodiment of the present invention can correct the various types of aberration and thus has a better optical performance.

In the optical arrangements of the present invention, the zoom lens adopts a four-group zoom configuration consisting of negative, positive, positive, and positive refractive power. In zooming under the inner zooming framework, the first lens group G1 is stationary, and the second lens group G2, the third lens group G3, and the fourth lens group G4 move along the optical axis. In zooming from the wide-angle end to the telephoto end, the distance between the third lens group G3 and the fourth lens group G4 is changed, the ratio of the variable distance between the first lens group G1 and the second lens group G2 at the wide-angle end to the variable distance between the first lens group G1 and the second lens group G2 at the medium-angle end is disproportional to the ratio of the variable distance between the first lens group G1 and the second lens group G2 at the medium-angle end to the variable distance between the first lens group G1 and the second lens group G2 at the telephoto end, and the distance between the second lens group G2 and the third lens group G3 may be decreased. Focusing is carried out mainly by moving the second lens group along the optical axis. The inner zoom lens of the present invention satisfies a high-resolution optical performance and such a zoom lens is thin and small in size.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A zoom lens comprising, in order from an object side to an image side along an optical axis:
    a first lens group having negative refractive power, the first lens group having a reflection member for changing the direction of light;
    a second lens group having positive refractive power;
    a third lens group having positive refractive power, the third lens group having a first lens on the most object side, the first lens having a convex surface facing the image side; and
    a fourth lens group having positive refractive power;
    wherein in zooming from a wide-angle end to a telephoto end, the first lens group is stationary, and the ratio of the variable distance between the first lens group and the second lens group at the wide-angle end to the variable distance between the first lens group and the second lens group at a medium-angle end is disproportional to the ratio of the variable distance between the first lens group and the second lens group at the medium-angle end to the variable distance between the first lens group and the second lens group at the telephoto end; in zooming from the wide-angle end to the telephoto end, the variable distance between the second lens group and the third lens group is decreased; and focusing is carried out by moving the second lens group along the optical axis.

2. The zoom lens according to claim 1, wherein the second lens group moves along with the third lens group and the fourth lens group in the zooming and then the second lens group moves alone to carry out the focusing after the zooming is accomplished.

3. The zoom lens according to claim 1, further comprising an aperture stop disposed between the second lens group and the third lens group, the aperture stop moving along with the third lens group.

4. The zoom lens according to claim 1, wherein the first lens group comprises a concave lens.

5. The zoom lens according to claim 4, wherein the reflection member is disposed at a side of the image-side surface of the concave lens of the first lens group.

6. The zoom lens according to claim 1, wherein the second lens group comprises a meniscus convex lens.

7. The zoom lens according to claim 1, wherein the third lens group comprises, in order from the object side to the image side along the optical axis, a first convex lens, a second convex lens, and a concave lens.

8. The zoom lens according to claim 1, wherein the fourth lens group comprises a positive lens.

9. The zoom lens according to claim 1, wherein the ratio of the focal length of the first loss group to that of the second lens group satisfies the following condition:

$$-0.5 \leq f1/f2 \leq 0.1,$$

where f1 is the focal length of the first lens group and f2 is the focal length of the second lens group.

10. The zoom lens according to claim 1, wherein the ratio of the focal length of the third lens group to that of the second lens group satisfies the following condition:

$$0.3 \leq f3/f2 \leq 1,$$

where f3 is the focal length of the third lens group and f2 is the focal length of the second lens group.

11. The zoom lens according to claim 1, wherein in the zooming, the third lens group moves toward the object side along the optical axis and the fourth lens group moves toward the image side along the optical axis such that the variable distance between the third lens group and the fourth lens group is increased.

12. The zoom lens according to claim 1, wherein in the zooming, the third lens group moves toward the object side along the optical axis and the fourth lens group moves toward the image side and then toward the object side along the optical axis such that the variable distance between the third lens group and the fourth lens group increases and then decreases.

13. The zoom lens according to claim 12, wherein the fourth lens group comprises a meniscus convex lens.

14. A zoom lens comprising, in order from an object side to an image side along an optical axis:
    a first lens group having negative refractive power;
    a second lens group having positive refractive power;
    a third lens group having positive refractive power; and
    a fourth lens group having positive refractive power;
    wherein the first lens group is stationary and the third lens group and the fourth lens group move in zooming; focusing is carried out by moving the second lens group; and the ratio of the focal length of the third lens group to that of the second lens group satisfies the following condition:

$0.3 \leq f3/f2 \leq 1$, where f3 is the focal length of the third lens group and f2 is the focal length of the second lens group.

15. The zoom lens according to claim 14, wherein the first lens group comprises a concave lens.

16. The zoom lens according to claim 14, wherein the first lens group comprises, in order from the object side to the image side along the optical axis, a meniscus concave lens and a bi-concave lens, and the convex surface of the meniscus concave lens faces the object side.

17. The zoom lens according to claim 14, wherein the second lens group comprises a meniscus convex lens.

18. The zoom lens according to claim 14, wherein the third lens group comprises, in order from the object side to the image side along the optical axis, a first convex lens, a second convex lens, and a concave lens, and the first convex lens is a bi-convex lens, of which the object-side surface and the image-side surface are both aspheric surfaces.

19. The zoom lens according to claim 14, wherein the fourth lens group comprises a bi-convex lens.

20. A zoom lens comprising, in order from an object side to an image side along an optical axis:
 a first lens group having negative refractive power, the first lens group having a reflection member for changing the direction of light;
 a second lens group having positive refractive power;
 a third lens group having positive refractive power, the third lens group having a first lens on the most object side, the first lens having a convex surface facing the image side; and
 a fourth lens group having positive refractive power;
 wherein in zooming from a wide-angle end to a telephoto end, the first lens group is stationary and the third lens group and the fourth lens group move in zooming, and the ratio of the variable distance between the first lens group and the second lens group at the wide-angle end to the variable distance between the first lens group and the second lens group at a medium-angle end is disproportional to the ratio of the variable distance between the first lens group and the second lens group at the medium-angle end to the variable distance between the first lens group and the second lens group at the telephoto end; in zooming from the wide-angle end to the telephoto end, the variable distance between the second lens group and the third lens group is decreased; and focusing is carried out by moving the second lens group along the optical axis; and
 wherein the ratio of the focal length of the third lens group to that of the second lens group satisfies the following condition:

$0.3 \leq f3/f2 \leq 1$, where f3 is the focal length of the third lens group and f2 is the focal length of the second lens group.

* * * * *